United States Patent
Courtoy et al.

(10) Patent No.: US 8,327,823 B2
(45) Date of Patent: Dec. 11, 2012

(54) MULTI-FUELLING AN ENGINE

(75) Inventors: Pierre Courtoy, Cranfield (GB); Andrew Frances Gamble Smith, Milton Keynes (GB); Douglas Greenhalgh, West Lothian (GB)

(73) Assignee: G-Volution Ltd., London (GB)

( * ) Notice: Subject to any disclaimer, the term of this patent is extended or adjusted under 35 U.S.C. 154(b) by 7 days.

(21) Appl. No.: 12/735,765

(22) PCT Filed: Mar. 2, 2009

(86) PCT No.: PCT/EP2009/052476
§ 371 (c)(1),
(2), (4) Date: Nov. 29, 2010

(87) PCT Pub. No.: WO2009/106647
PCT Pub. Date: Sep. 3, 2009

(65) Prior Publication Data
US 2011/0088654 A1    Apr. 21, 2011

(30) Foreign Application Priority Data
Feb. 28, 2008    (GB) .................................. 0803708.7

(51) Int. Cl.
F02B 7/00    (2006.01)

(52) U.S. Cl. .................... 123/299; 123/431; 123/190 A; 123/525; 123/25 C

(58) Field of Classification Search .................. 123/1 A, 123/431, 27 GE, 525, 299, 300, 198 A, 575, 123/25 C, 25 E, 25 F
See application file for complete search history.

(56) References Cited

U.S. PATENT DOCUMENTS

| 7,287,509 | B1 | 10/2007 | Brehob |
| 2002/0166515 | A1 | 11/2002 | Ancimer et al. |
| 2007/0289573 | A1 | 12/2007 | Leone et al. |

FOREIGN PATENT DOCUMENTS

| WO | WO 2008/000095 A1 | 1/2008 |
| WO | WO 2008/104674 A2 | 9/2008 |

Primary Examiner — Hai Huynh
(74) Attorney, Agent, or Firm — Husch Blackwell LLP

(57) ABSTRACT

A compression ignition engine is supplied with a first fuel in a flow of air and a second fuel is injected into the combustion chamber. The first fuel comprises a more volatile fuel than diesel such as ethanol, LPG or other combustible gas; the second fuel comprises diesel or biodiesel; and the second fuel is injected in multiple pulses in each ignition cycle with the first pulse acting as a pilot pulse to trigger ignition, and the timing of the second pulse being such as to modify the temperature through evaporation of the second fuel and thereby reduce the combustion temperature and mitigate knock susceptibility. Preferably the pilot pulse is followed by a single further pulse of the second fuel in the ignition cycle. The engine may be controlled to operate in two different modes, one mode for light and medium load conditions when there is only a pilot pulse injection of the second fuel which reduces $NO_x$ and soot emissions, and the other mode for higher load conditions when there is a pilot pulse injection followed by a main pulse injection of the second fuel. The first fuel may comprise bioethanol and or one or more of the following: ethanol, butanol, propanol, lpg, natural gas, hydrogen.

10 Claims, 24 Drawing Sheets

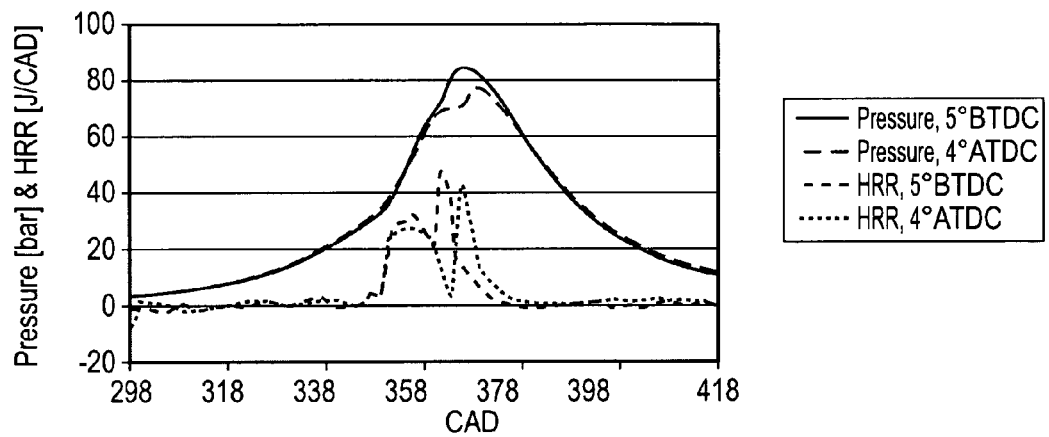
FIG. 31
| Main Timing | Picture | Intensity |
|---|---|---|
| 5°BTDC | | 188 |
| 2°BTDC | | 127 |
| 2°ATDC | | 89 |
FIG. 32
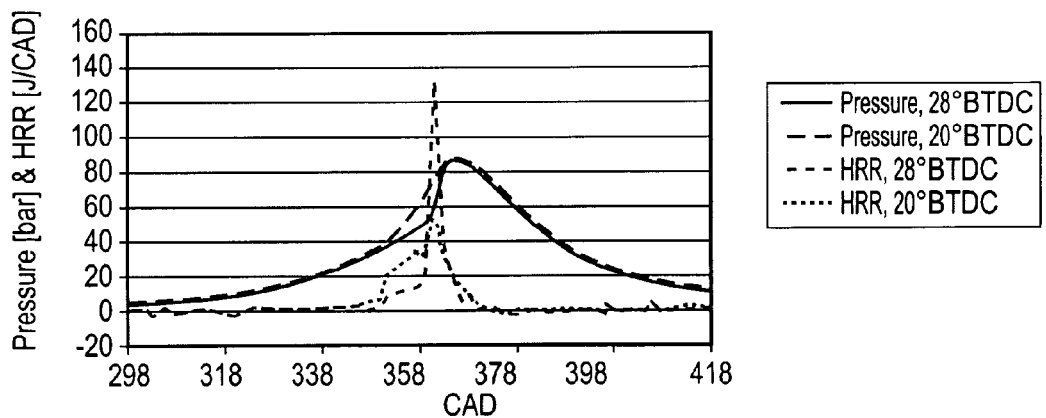
FIG. 33

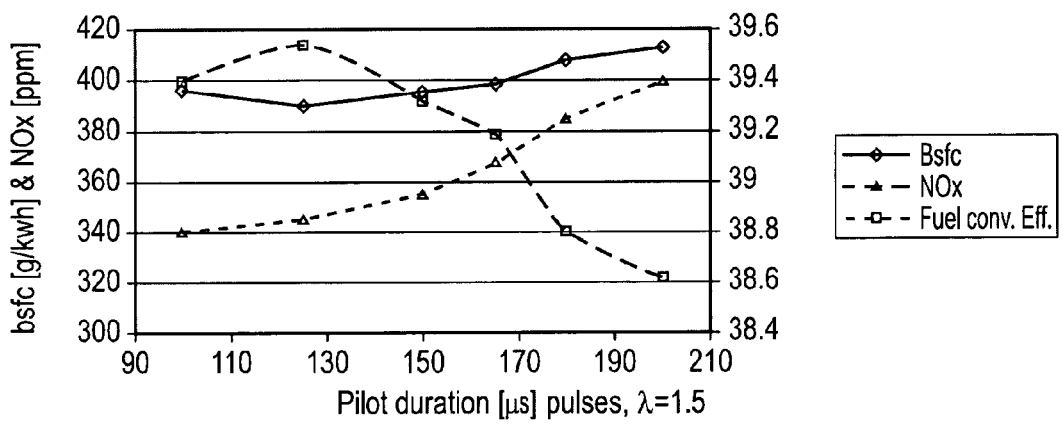
FIG. 34
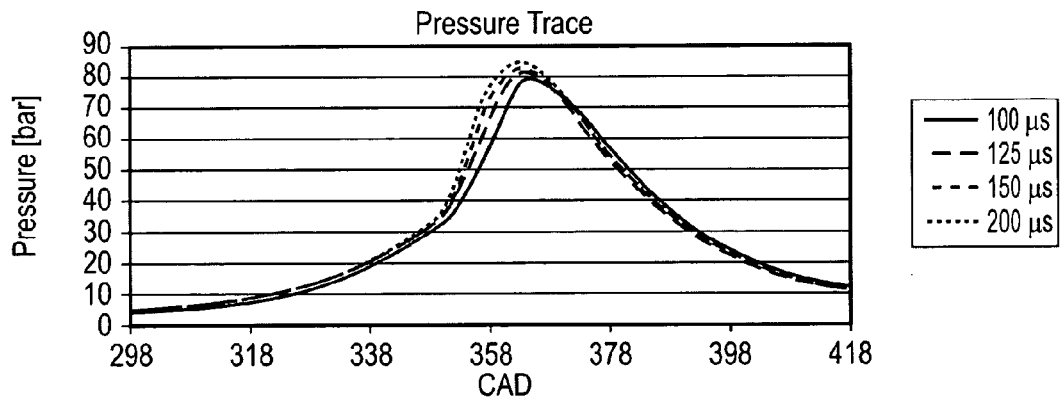
FIG. 35
FIG. 36

| Main Duration | Picture | Intensity |
|---|---|---|
| 180 | | 72 |
| 220 | | 113 |
| 260 | | 118 |
FIG. 42
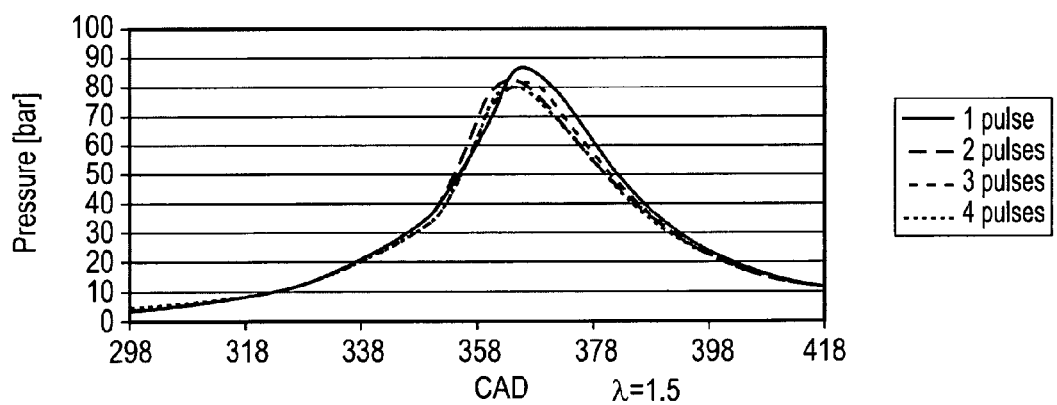
FIG. 43
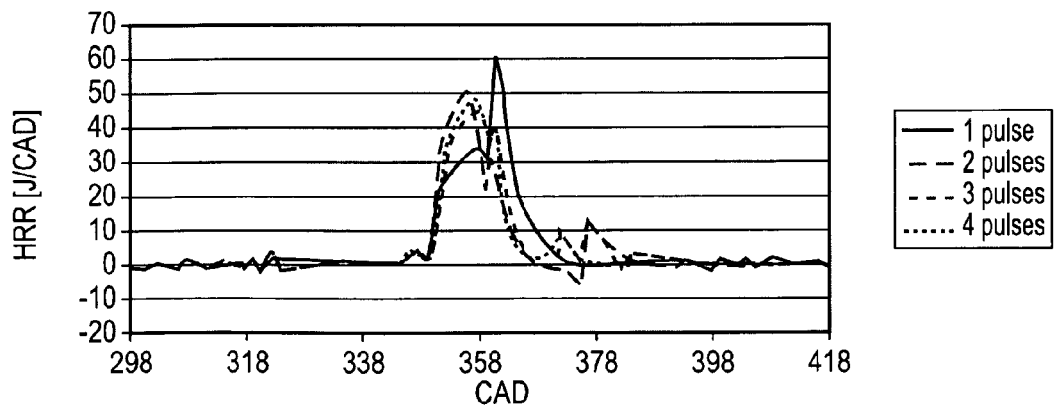
FIG. 44

| Number of pulses | Picture | Intensity |
|---|---|---|
| 1 | | 17 |
| 2 | | 99 |
| 3 | | 315 |
| 4 | | 476 |

| Lambda | 0% water | 15% water | Number of pulses |
|---|---|---|---|
| 1.7 | | | 1 |
| 1.5 | | | 2 |
| 1.3 | | | 1 |
| 1.15 | | | 1 | ately.
MULTI-FUELLING AN ENGINE

The present application is a 35 U.S.C. §371 submission of international application number PCT/EP2009/052476, entitled Multi-Fuelling an Engine and filed 2 Mar. 2009, which was published in the English language on 3 Sep. 2009 with publication number WO 2009/106647 A1, and which claims the benefit of the filing date of GB 0803708.7, filed 28 Feb. 2008.

TECHNICAL FIELD

This invention relates to a method of operating a compression ignition engine using multi-fuelling.

Dual-fuelling of engines is well known and has been investigated for numerous reasons including the improvement of engine emissions and to reduce dependence on fossil fuels such as gasoline and diesel. The interest in dual-fuelling continues with increased concerns of global warming and expectation of stricter engine emission regulations, and the promotion of bio fuels. Biofuels are considered to be more carbon neutral in that they are manufactured from a biomass that has absorbed carbon dioxide from the environment, and which is not considered additive when released again upon combustion. Biofuels are also considered to be desirable to counter the depletion of fossil fuel reserves. Bioethanol is one of the most widely used biofuels used in engines. It is generated from a wide variety of vegetable feed stocks and involves a fermentation process to produce the ethanol, a distillation process to separate the ethanol, and a dehydration process to dry the ethanol from a level of about 95.6% ethanol to 99.8% ethanol. Dry or anhydrous bioethanol is generally considered suitable for use in place of gasoline and diesel in internal combustion engines.

Bioethanol and gasoline blends are used in spark ignition engines in proportions from 5% bioethanol in Europe, to 85% in Brazil, where engines are especially adapted to operate on bioethanol-rich mixture. Blending bioethanol with diesel for use in compression ignition (CI) engines presents difficulties because of its low cetane number and high auto-ignition temperature, and also because of the difficulty of forming a stable mixture between the two fuels. The preferred approach therefore with CI engines is to use dual-fuelling, that is, to introduce the two fuels separately into the combustion chamber of the engine. This can be done using two separate fuel injectors, which would require some re-design of existing internal combustion engines. The alternative approach is to inject one fuel and introduce the other fuel with the ingested air to the combustion chamber, this being known as fuel aspiration or fumigation. The invention is principally concerned with dual-fuelling of CI engines because of their higher efficiency.

A known problem with dual-fuelled engines running on diesel and bioethanol is knock caused by detonation of unburnt premixed charge or end gas in the combustion chamber, which is especially prone to occur if the temperature exceeds 700 to 800° K. Knock causes sudden pressure and temperature increases which pose a risk to the mechanical integrity of the engine. Generally, knock limits the extent to which bioethanol can be used in place of diesel in a dual-fuelled engine. The maximum power at which the engine can be operated is therefore limited.

Another known problem with dual-fuelled CI engines operating on diesel and bioethanol is the low thermal efficiency of the engine under light or part load conditions due to the poor combustion of dilute mixtures of the bioethanol; this is turn leads to an increase in unburnt hydrocarbon emissions.

An object of the invention is to provide an improved method of operating a CI engine using dual-fuelling.

DISCLOSURE OF THE INVENTION

A method according to the invention comprises supplying a first fuel to a combustion chamber of the engine and injecting a second fuel into the combustion chamber; characterised in that the first fuel comprises a volatile liquid or combustible gas; the second fuel comprises diesel or biodiesel; and the second fuel is injected in multiple pulses in each ignition cycle with the first pulse acting as a pilot pulse to trigger ignition, and the timing of the second pulse being such as to modify the temperature through evaporation of the second fuel and thereby reduce the combustion temperature and mitigate knock susceptibility.

The pilot pulse needs to inject sufficient of the second fuel to ignite the mixture reliably at all loads and to generate a high enough temperature to vaporise the second pulse when it is injected. Too little pilot fuel will cause cycle-to-cycle combustion variability and even misfiring, but too much pilot fuel will lead to increased knock susceptibility, nitrous oxide ($NO_x$) emissions, and increased ignition delay. Ignition delay also increases with the quantity of the first fuel added.

The injection timing of the pilot pulse needs also to have regard to its effect on knock and $NO_x$ at all loads, advanced timing being preferable under light to medium loads, and slightly retarded timing being preferable at higher loads. However, the timing range is quite small. More important is the relative injection timing of the first and second pulses. The second pulse needs to be injected when the combustion chamber temperature is sufficiently high and thus the two pulses need to be appropriately separated for the combustion process to take place; but if the pulses are separated too much then cycle-to-cycle variation in combustion become a problem.

The quantity of the second fuel injected in the second pulse is related to the quantity of the first fuel added, the substitution level of the second fuel by the first fuel being a primary consideration in replacing fossil fuel, such as diesel, with biofuel, such as bioethanol. The ignition delay increases with the percentage of biothanol, but substitution levels of 30 to 70% can still be achieved.

As regards injection of further pulses of fuel after the second pulse, this is possible to increase the quantity of fuel injected. The effect of third or fourth pulses on knock and $NO_x$ is only slight, but soot emissions increase. A pilot pulse followed by a single further pulse or main pulse is the preferred operating mode to optimise $NO_x$ and soot emissions.

A further benefit of the invention is that when the first fuel is a bio fuel, such as bioethanol, the operation of the engine is relatively tolerant to the water content of the bio fuel, and this allows use of bio fuel which has not been dehydrated and has therefore a lower production cost. The effect of the water content requires more fuel to be injected for the equivalent energy content, and the amount of fuel injected in the pilot pulse needs to be increased to ensure ignition of the mixture. The effect on knock and $NO_x$, if anything, is to improve them. The only adverse effect is in slightly increased soot emissions.

The first fuel may be supplied by direct injection or through aspiration. The first fuel is preferably supplied as a single charge in the ignition cycle.

In one embodiment of the invention, the engine may be controlled to operate in two different modes, one mode for light and medium load conditions when there is only a pilot pulse injection of the second fuel which reduces $NO_x$ and soot emissions, and the other mode for higher load conditions when there is a pilot pulse injection followed by a main pulse injection of the second fuel.

Although the emphasis above has been on the use of bio fuels, such as bioethanol, which is currently one of those being used commercially, the invention is applicable for use of a wide range of fuels as the aspirated fuel including ethanol, butanol, propanol, liquid petroleum gas, natural gas and hydrogen. Also, whilst the invention is described as using dual fuels or two fuels, the use of a third or more fuels is not excluded.

DESCRIPTION OF THE DRAWINGS

The invention will now be described by way of example with reference to the following drawings:

FIG. 31: Pressure trace & HRR, PD 180 µs, PT 20° BTDC, MD 250 µs, 1 pulse, $\lambda=1.5$
FIG. 32: Soot vs. MT, PD 150 µs, PT 20° BTDC, MD 280 µs, 2 pulses, $\lambda=1.5$
FIG. 33: Pressure trace & HRR, PD 180 µs, MD 270 µs, MT 2° BTDC, 1 pulse, $\lambda=1.5$
FIG. 34: Soot Vs PT, PD 150 µs, MT 0° BTDC, MD 280 µs, 2 pulses, $\lambda=1.5$
FIG. 35: NOx, bsfc & Fuel cony eff. vs. PD, PT 20° BTDC, MD 400 µs, MT 2° BTDC, 4 pulses, $\lambda=1.5$
FIG. 36: Pressure trace vs. PD, PT 20° BTDC, MD 400 µs, MT 2° BTDC, 4 pulses, $\lambda=1.5$
FIG. 42: Soot Vs MD, MT 0° BTDC, PD 150 µs, PT 20° BTDC, 2 pulses, $\lambda=1.5$
FIG. 43: Pressure trace in function of number of pulses, MT 2° BTDC, 50% Bioethanol, $\lambda=1.5$
FIG. 44: HRR in function of number of pulses, MT 2° BTDC, 50% Bioethanol, $\lambda=1.5$

EMBODIMENTS OF THE INVENTION

1) Experimented Equipment

Figure 66:
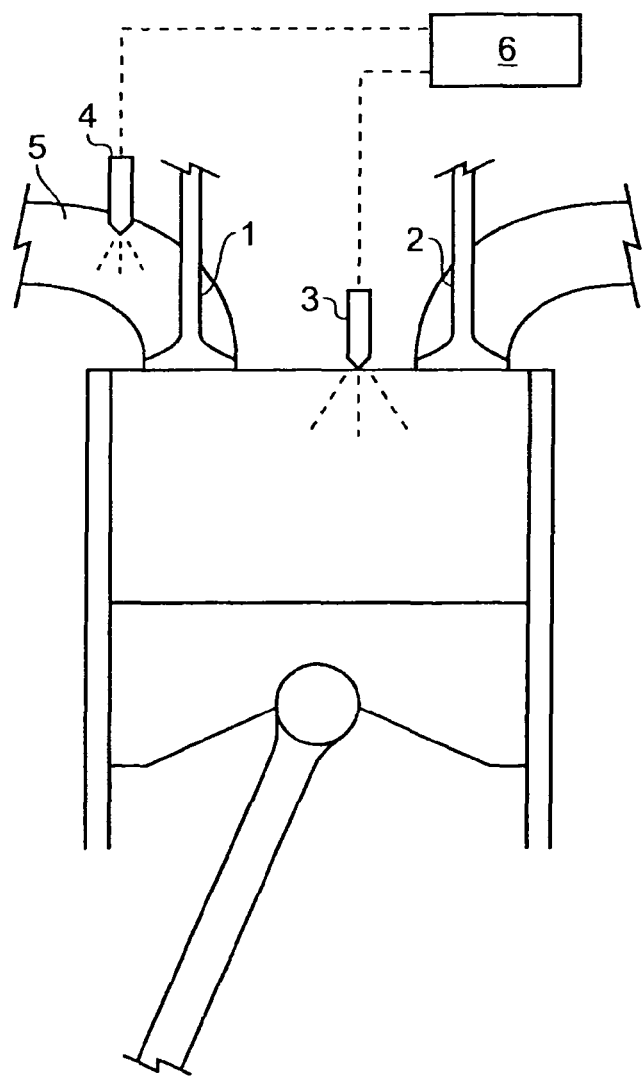
FIG. 66: Schematic drawing of a research engine.

The invention is now described by reference to experiments conducted in relation to dual-fuelling of CI engines using a Ricardo E6, single cylinder, four stroke research engine shown schematically in FIG. 66. The engine is fitted with a head having two poppet valves 1, 2 with a direct diesel injector 3 that allows multi-split injection (up to 5 per cycle) and is fed by a common rail with a maximum pressure of 1600 bars. The rail pressure is independently controllable by the fuel pump. A supplementary injector 4 is also mounted on the air intake pipe 5 to allow the part injection of bioethanol. The two fuel injectors 3, 4 are controlled by a central unit 6, which varies the injection timings and fuel qualities. The engine is adapted to run between 500 rpm and 3000 rpm but tests were mostly conducted at a low speed of 1000 rpm where susceptibility to engine knock is greater, this being an issue with which the invention is concerned.

The engine is fitted with temperature sensors, in the air intake pipe to help determine the density of the incoming air, and in the exhaust gas flow at the coolant inlet and outlet. These temperature measurements are used to ensure steady state conditions for making test measurements.

An in-cylinder pressure device comprising a pressure transducer placed near to the exhaust valve and having an output connected via a charge amplifier to an oscilloscope and fast data acquisition system.

A broad range lambda sensor is provided in the engine exhaust stream close to the exhaust valve to analyse the air-fuel ratio, thereby giving an indication of engine load.

A $NO_x$ analyser is provided to analyse $NO_x$ emissions at the exhaust.

A soot detector is provided to measure soot in the exhaust, and comprises a laser-induced incandescence detector that measures the light emitted by the soot particles when heated by a laser beam.

2) Experimental Results for Diesel Operation

First diesel experiments were performed to obtain baseline results for comparison with results from Dual-Fuel operation.

The injection timings of the pilot and main injections were kept constant during all the tests at a value of 20° and 5° BTDC, respectively. These values came from previous experiments that established these as the best compromise between performance and emissions.

The only parameters that were changed during the tests were the duration of both injections and the number of pulses of the main injection. Four series of tests were performed as follows for a λ range from 4 to 1.3.

1. Pilot duration of 238 µs, main duration from 0 to 490 µs with 2 pulses.
2. Pilot duration from 180 to 285 µs in parallel with main duration from 175 to 475 µs, 2 pulses.
3. Pilot duration of 200 µs, main duration from 170 to 510 µs with 2 pulses.
4. Pilot duration of 200 µs, main duration from 235 to 675 µs with 3 pulses.

Two and three pulses were used in the main pulses as only 1 pulse gives too high emissions and 4 pulses do not bring much improvement compared to 2 and 3 pulses.

Figure 1:
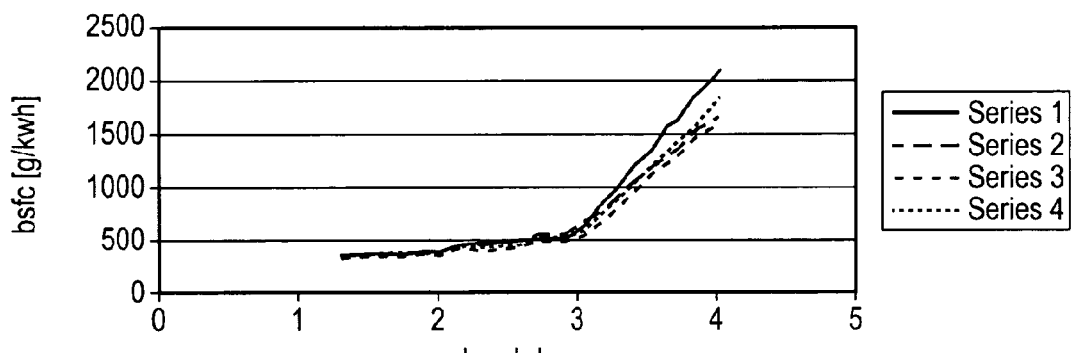
FIG. 1: bsfc, Diesel tests

The first element of comparison between these four series of tests is the brake specific fuel consumption (bsfc) that is illustrated on FIG. 1 where the number of the Series on the curves refer to the series of four tests listed above. The differences between tests are quite small apart for low load conditions, where a large quantity of pilot fuel is slightly detrimental.

Figure 2:
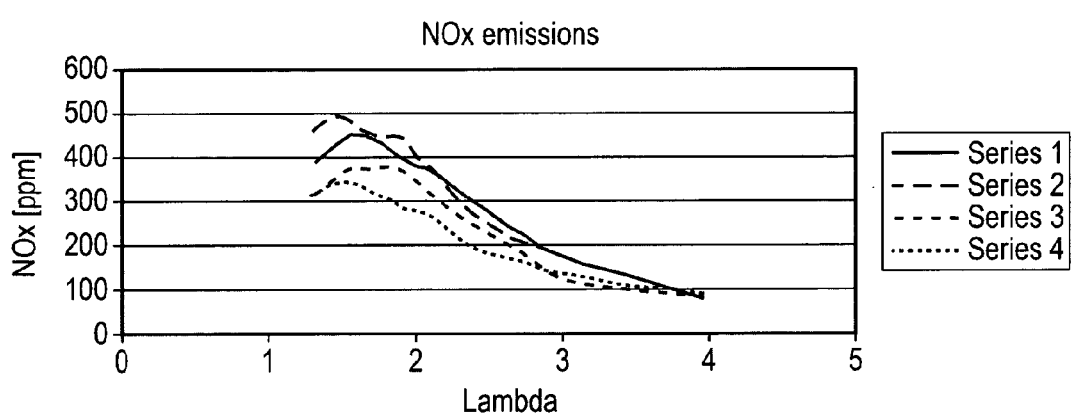
FIG. 2: NOx emissions, Diesel
Figure 3:
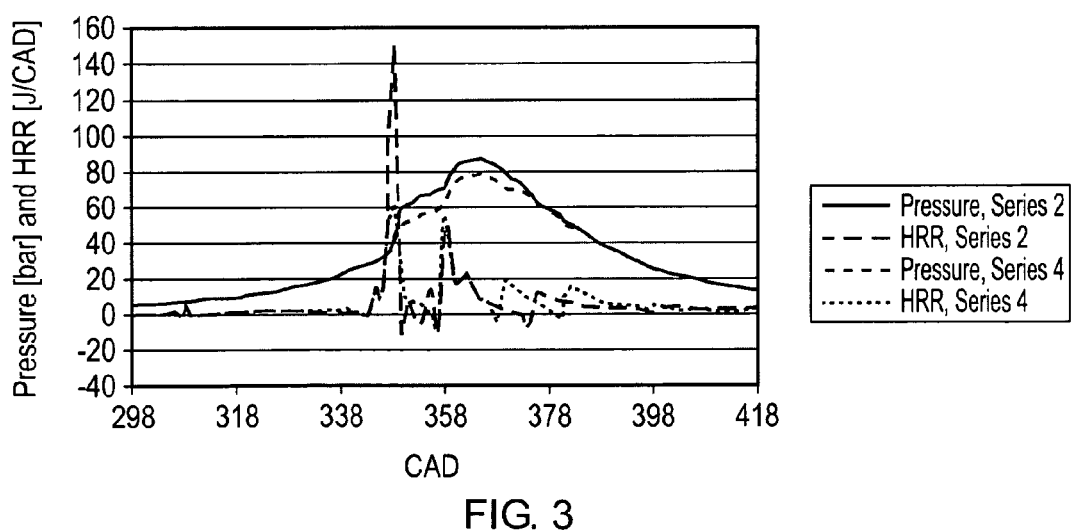
FIG. 3: Pressure trace and HRR, Diesel, $\lambda=1.3$.

When it comes to NOx emissions, the general trend is that a bigger quantity of pilot fuel gives higher emissions (FIG. 2). Moreover, a supplementary pulse (Series 4) has a beneficial influence on noxious emissions by limiting the Heat Release Rate (FIG. 3) and also on the noise emitted by the engine.

Figure 4:
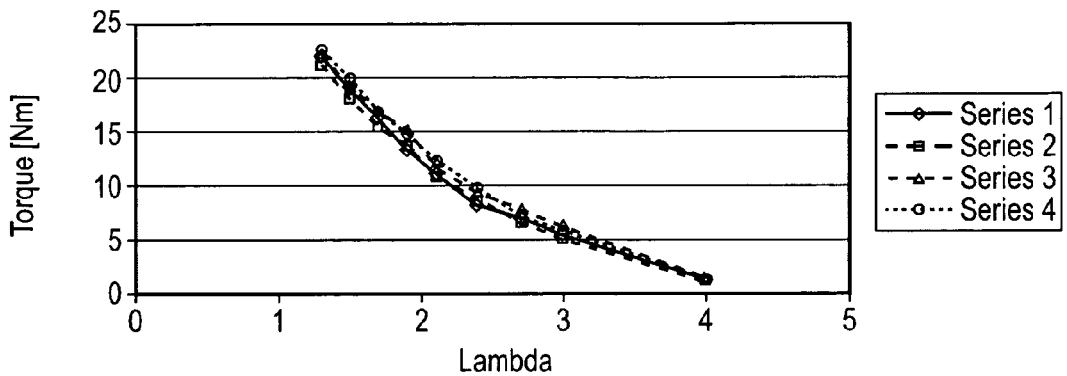
FIG. 4: Torque, Diesel

The final element of comparison for the Diesel tests is the output torque that is plotted on FIG. 4. Here again, the 4 Series tests give very similar results even if smaller quantity of pilot injection offers a small advantage.

These results indicate that the best results come from Series 4. These results are used in the following sections for comparison of diesel operation with Dual-Fuel operation.

3) Experimental Results for Dual-Fuel Operation

Figure 5:
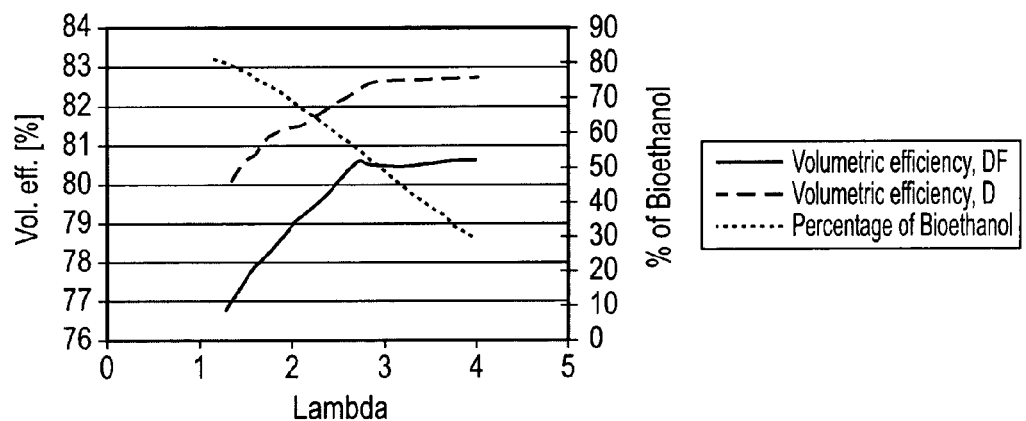
FIG. 5: Volumetric efficiency and Percentage of Bioethanol vs. load.

The first Dual-Fuel experiments were done with only a pilot injection that acts as a spark plug with the goal to obtain a high substitution rate of Diesel per bioethanol. The injection timing was kept constant at 20° BTDC during the tests as well as the injection duration (250 µs). The only parameter that was changed is the quantity of bioethanol of which the percentage varied between 29% and 81% (FIG. 5). It can also be seen on FIG. 5 that the volumetric efficiency of the engine drops slightly with the fumigation of bioethanol that replaces a portion of the incoming fresh air.

Figure 6:
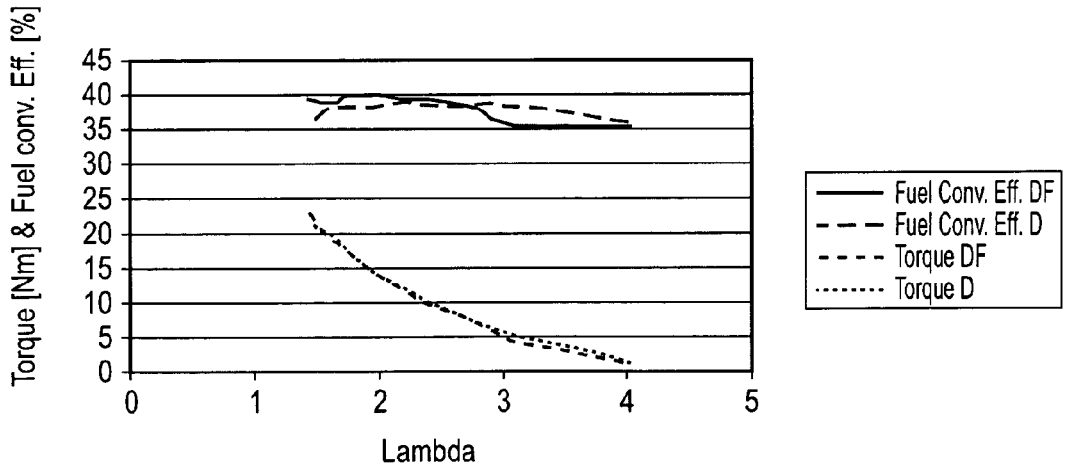
FIG. 6: Fuel conversion efficiency and torque, Diesel vs. Dual-Fuelling.
Figure 7:
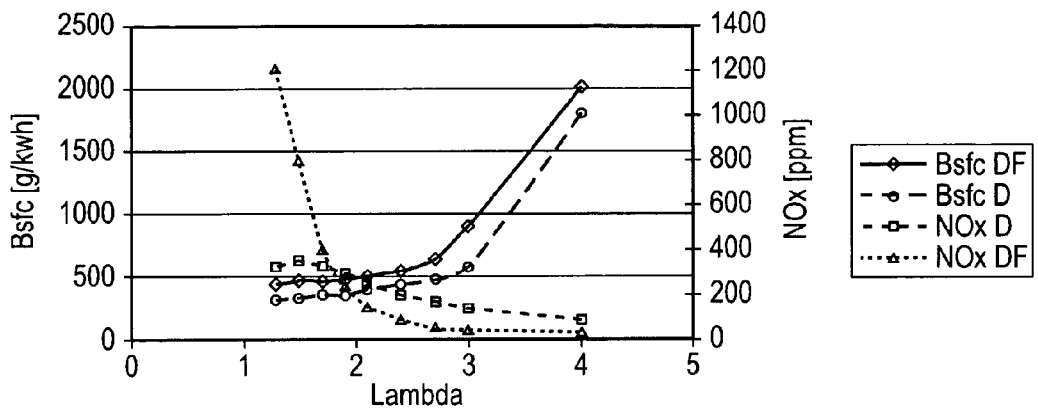
FIG. 7: bsfc and NOx emissions, Diesel vs. Dual-Fuelling.

The fuel conversion efficiency and torque are lower for Dual-Fuelling than for diesel at low loads whereas the tendency is inverted at higher loads (FIG. 6). When analysing the bsfc on FIG. 7, it is clear that Dual-Fuelling is penalized by the poor LHV of bioethanol compared to diesel only.

Concerning NOx emissions, Dual-Fuelling brings amelioration for lambda values higher than 1.9. This diminution of NOx emissions mainly comes from the important cooling of the charge by the evaporation of bioethanol. However when the load becomes higher, the NOx emissions suddenly increase violently due to the very high rate of heat release (FIG. 8) leading to high temperature.

Figure 8:
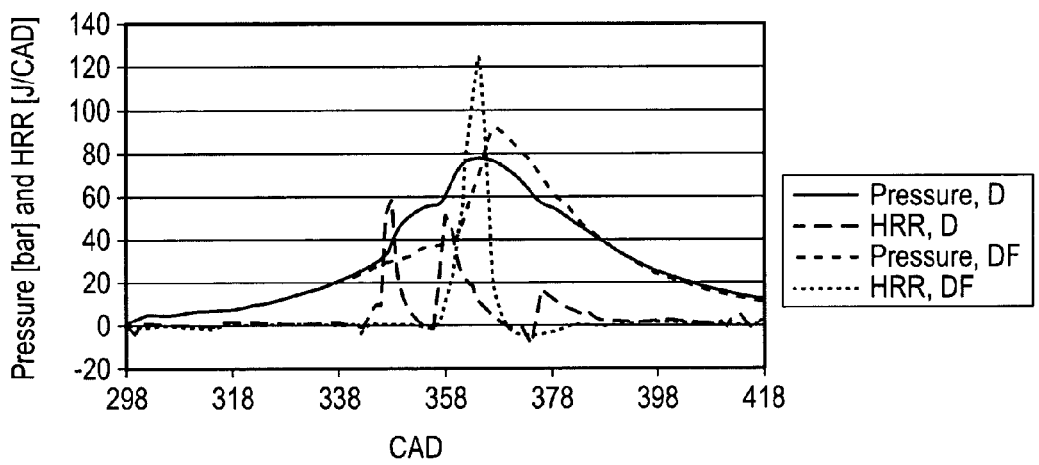
FIG. 8: Pressure trace & HRR, Diesel vs. Dual-Fuelling, $\lambda=1.3$

The pressure trace of Dual-Fuel under high load operation is characterized by a sudden rise around TDC that is synonymous of knock. The loud noise emitted by the engine confirms the observations made from the pressure trace. Another interesting observation is the net increase of the ignition delay under Dual-Fuel operation (both pilot injection timings on FIG. 8 are equal to 20° BTDC).

Figure 9:
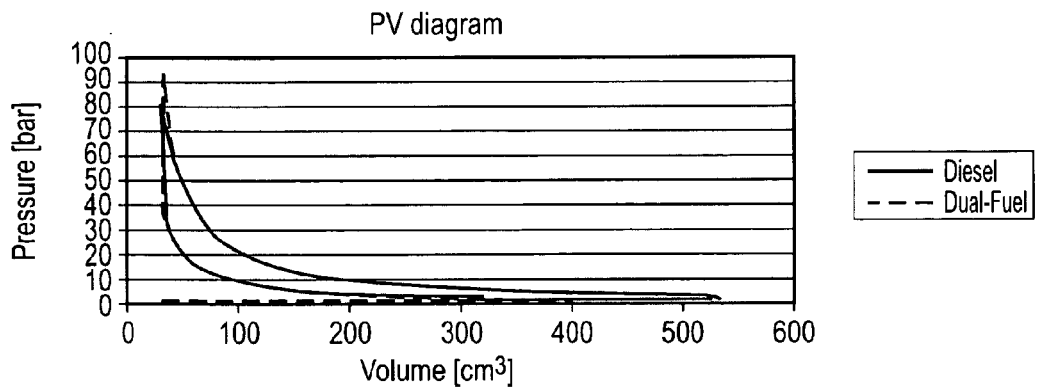
FIG. 9: PV Diagram, Diesel vs. Dual-Fuelling, $\lambda=1.3$

FIG. 9 is a comparison of Diesel and Dual-Fuel P-V diagrams and shows that Dual-Fuel combustion occurs nearly at constant volume approaching an Otto cycle.

Figure 10:
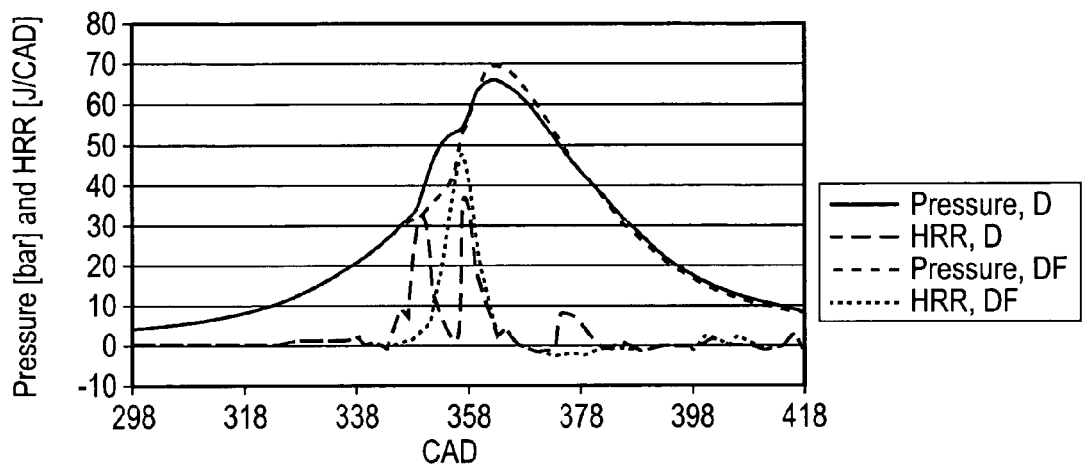
FIG. 10: Pressure trace & HRR, Diesel vs. Dual-Fuelling, $\lambda=2.7$

At lower load (λ=2.7), the pressure traces of Diesel and Dual-Fuelling are still different (FIG. 10). However the Dual-Fuel pressure trace that remains smooth is an indication of non-knock region. The limit of knock is for λ around 1.9 with 70% of bioethanol. A final comment can be made when comparing FIG. 8 and FIG. 10: the ignition delay increases with the percentage of fumigated bioethanol.

Figure 11:
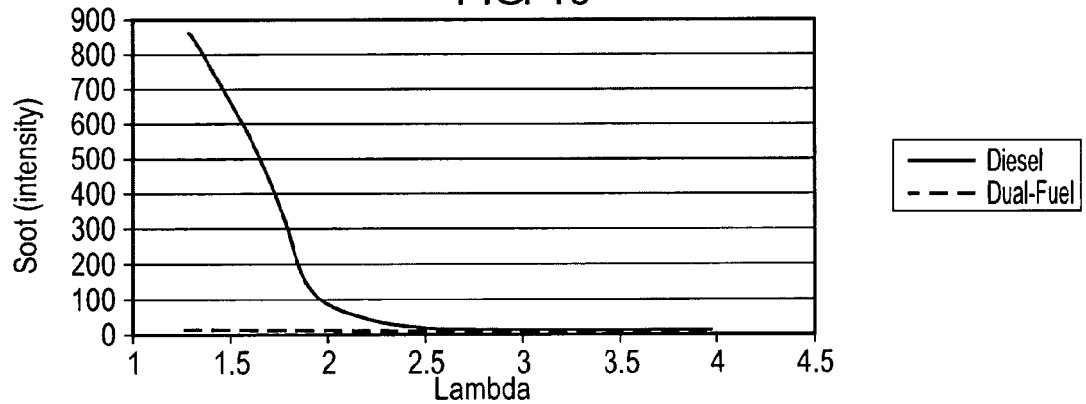
FIG. 11: Soot vs. load, diesel/Dual-Fuel comparison
Figure 12:
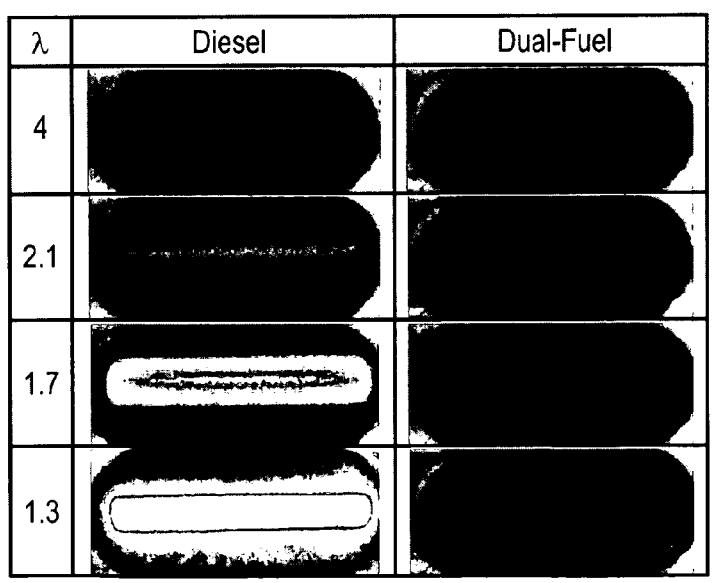
FIG. 12: Soot comparison between Diesel & Dual-Fuelling

When it comes to soot, the effect of bioethanol fumigation is very beneficial (FIGS. 11 and 12). The combustion of bioethanol when only a pilot injection of Diesel is injected is very similar to the combustion of gasoline in a SI engine leading to almost soot-free exhaust gases. Whatever the pilot fuel quantity and timing, the same results for soot is observed under Dual-Fuel operation.

4) Effect of Pilot Fuel Quantity

Different pilot injection durations were tried in order to investigate the effect of the pilot fuel quantity on Dual-Fuel operation. The pilot injection timing was kept constant at a value of 20° BTDC. The range of tested duration varied from 150 to 275 µs. It was decided not to exceed a duration of 275 µs as at this level it already gives a pressure trace with a significant pressure rise synonymous of knock onset.

Figure 13:
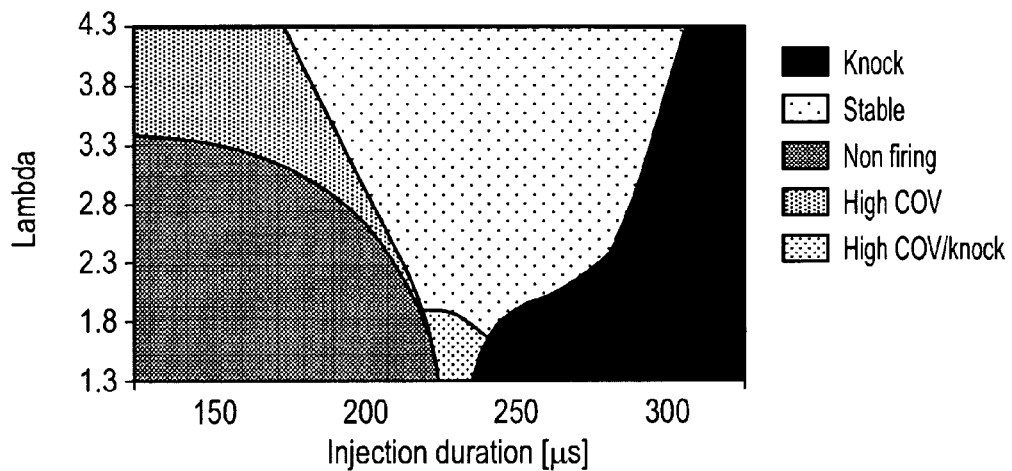
FIG. 13: Functioning regimes in function of load and pilot duration

A map representing different functioning regimes in function of the load and pilot duration is shown on FIG. 13. For a practical realization of the map, the different areas are clearly delimited but in reality the transition between the different operating modes occurs more gradually.

The terminology "High COV" (COV: Coefficient of Variation) used on the map is characterized by important cycle to cycle variations that are detected on the oscilloscope screen by important fluctuations of the pressure trace.

Figure 14:
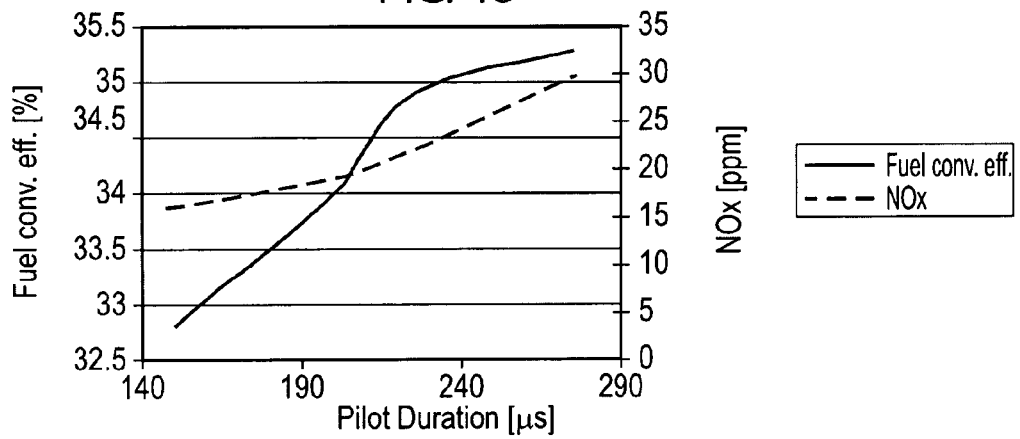
FIG. 14: Fuel conversion efficiency & NOx emissions vs. PD, PT 20° BTDC, $\lambda=4$

The first observation is that a sufficient amount of pilot fuel should be injected at low load in order to deliver enough energy into the cylinder to ignite the homogeneous mixture formed by bioethanol and air. In the contrary case, the combustion is not stable (FIG. 13, high COV). Low fuel conversion efficiency accompanied by corresponding high Unburnt Hydrocarbons (UHC) results from the use of a small pilot quantity (FIG. 14).

Figure 15:
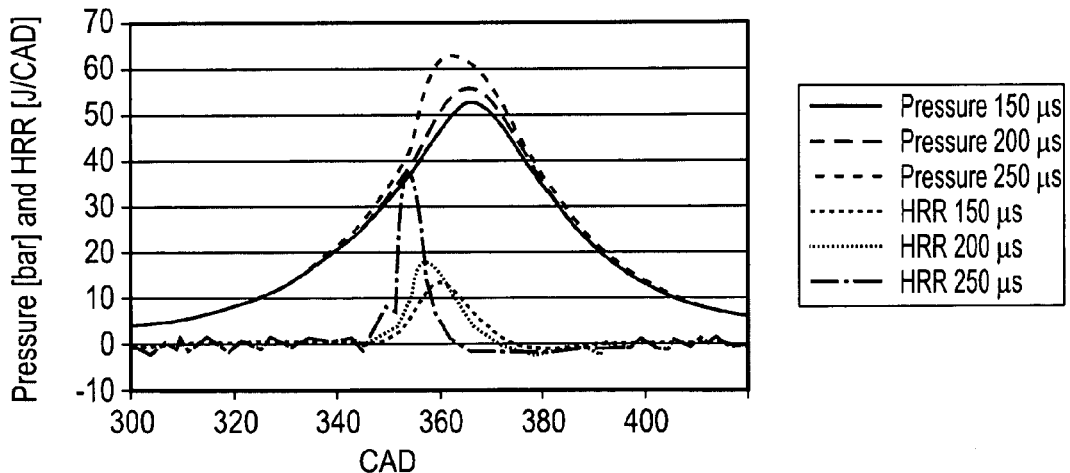
FIG. 15: Pressure trace & HRR vs. PD, PT 20° BTDC, $\lambda=4$

FIG. 15 shows low load pressure traces for injection timing from 150 to 250 µs. The non stability being characterized by important cycle to cycle variations results in an average pressure trace over 20 cycles that decreases with the injection duration. The evidence of weak combustion is also evident when observing the HRR of the small injection duration (spread energy release).

The second observation is that a sufficient amount of pilot fuel is also necessary at high load (and not only at low load) to correctly ignite the charge. The areas of the map concerned by this observation are the "non-firing" and "knock or high COV" areas.

The only explanation found is that the cooling of the charge by bioethanol is such that the ignition delay becomes very long and that the small energy introduced by the pilot fuel is not sufficient to ignite the mixture.

The third observation concerns knock: a bigger quantity of pilot fuel leads to earlier knock. This is easily observed on the pressure traces of FIG. 16 where the longer duration leads to steeper pressure slope. However, a small quantity of pilot fuel also causes misfiring even at full load as explained above leading to the impossibility of reaching full load without knock with only a pilot injection. When observing FIG. 16, it is also clear that the ignition delay decreases significantly if a larger amount of pilot fuel is injected.

Figure 16:
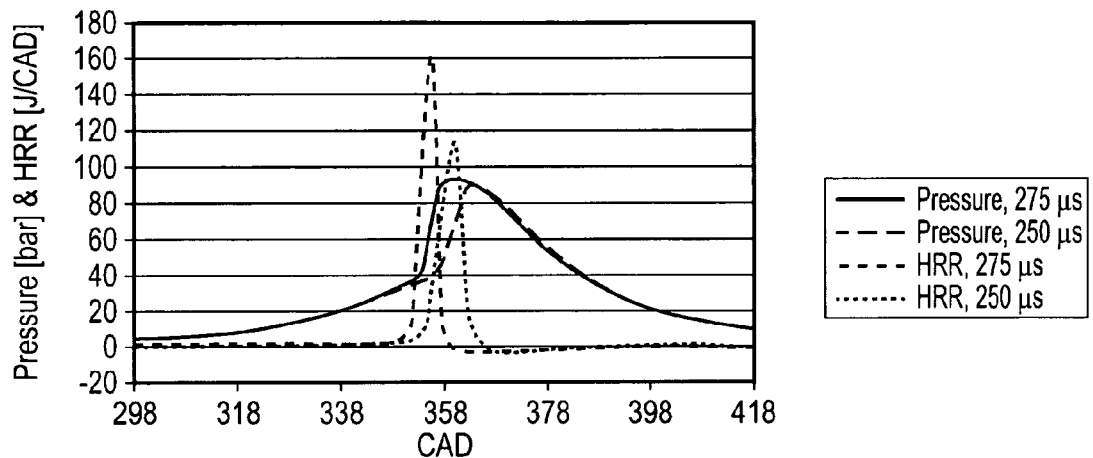
FIG. 16: Pressure trace & HRR vs. PD, PT 20° BTDC, $\lambda=1.7$
Figure 17:
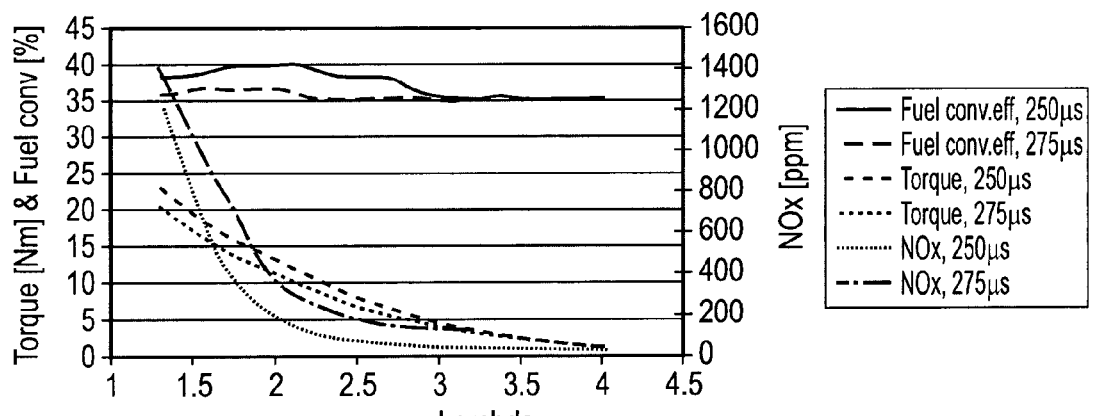
FIG. 17: Fuel conversion efficiency, torque and NOx in function of PD, PT 20° BTDC, $\lambda=4$

The fourth observation concerning the influence of pilot fuel quantity is the increase of noxious emissions (FIG. 17) with the amount of pilot fuel due to higher rate of heat release rate (FIG. 16).

Finally, the torque output and fuel conversion efficiency also decrease when too much pilot fuel is injected.

5) Effect of Pilot Fuel Injection Timing

The operating procedure to investigate the influence of pilot fuel timing was to keep a constant injection duration of 250 µs and a constant value of λ. The injection timing was varied from 0° BTDC to 28° BTDC in each case.

Figure 18:
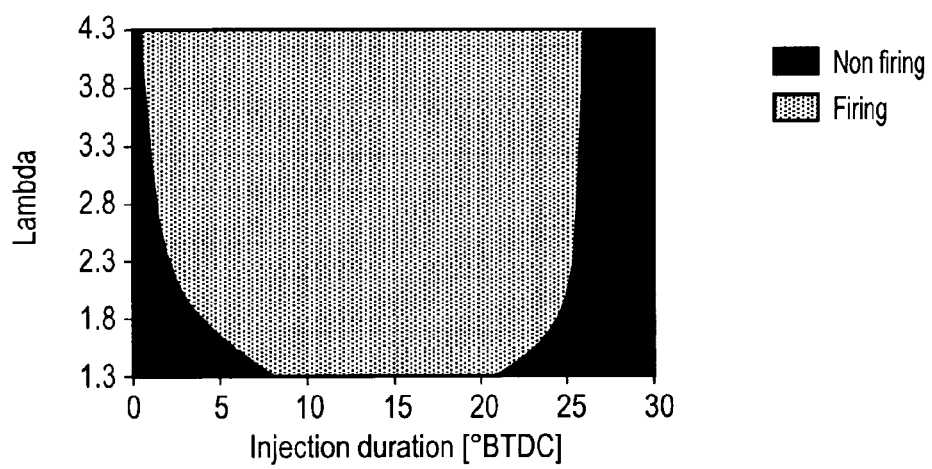
FIG. 18: Firing map as function of injection timing & load, PD 250 µs

A firing map of the load against injection timing is shown on FIG. 18. The general tendency is that the range of injection timing diminishes with the increase in load or more exactly with the increase in bioethanol percentage.

Figure 19:
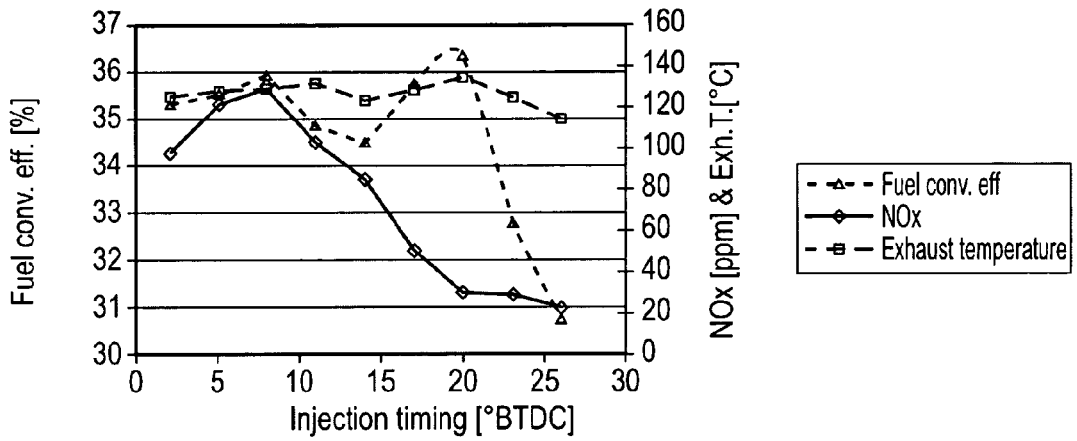
FIG. 19: Fuel conversion efficiency, NOx & exhaust temperature vs. PT, PD 250 µs, $\lambda=4$
Figure 20:
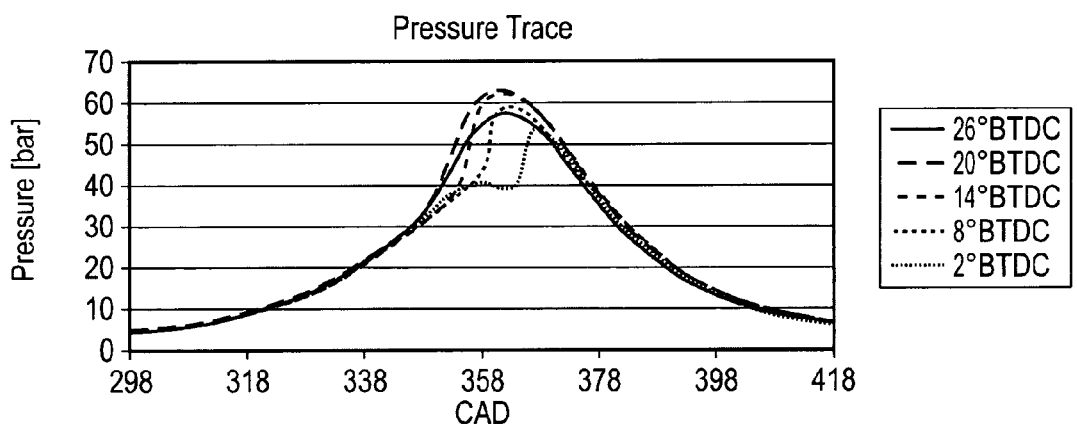
FIG. 20: Pressure trace vs. PT, PD 250 µs, $\lambda=4$

Observations at low load ($\lambda=4$):

At low load or low bioethanol percentage, the engine accepts a wider range of injection timing but its effect is very marked. The general trend is that a retarded injection timing leads to high NOx emissions (FIG. 19) due to higher heat release rate (FIG. 21) and louder noise because of more sudden pressure rise (FIG. 20). However, a timing that is too advanced results in poor performance (low fuel conversion efficiency leading to high UHC emissions, low in cylinder pressure giving low torque) and a weak stability (very spread release of energy). At the opposite, timing that is too retarded results in high NOx emissions and high noise due to high HRR and sudden pressure rise, respectively.

An interesting thing to note is that the NOx emissions go up with the HRR and maximum pressure (to a smaller extent) and that the exhaust temperature only reflects the fuel conversion efficiency (and has little correlation with NOx emissions), namely the higher the fuel conversion efficiency, the higher the exhaust temperature.

To finish with the effect of the injection timing at low load, it is clear that the best injection timing is around 20° BTDC.

Figure 22:
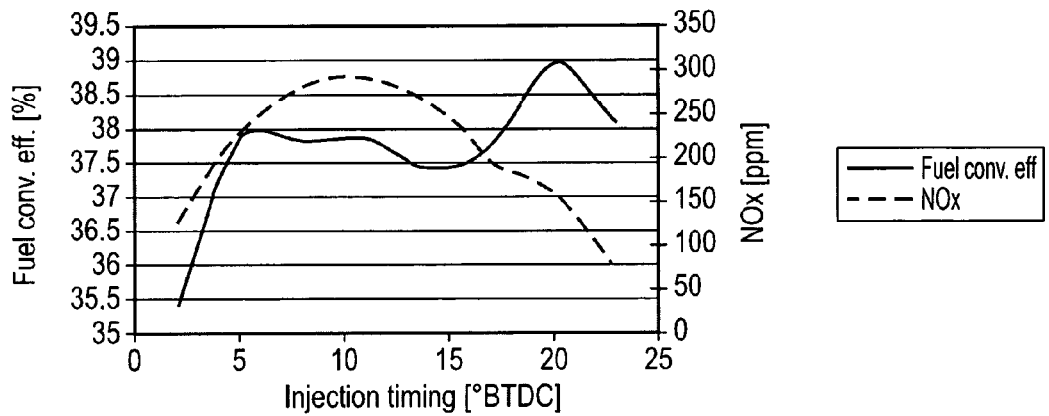
FIG. 22: Fuel conversion efficiency & NOx vs. PT, PD 250 µs, $\lambda=2.1$
Figure 23:
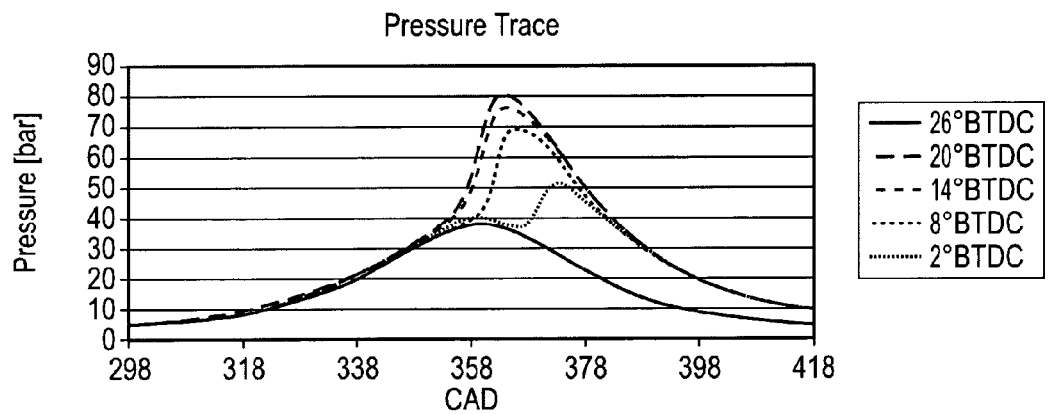
FIG. 23: Pressure trace vs. PT, PD 250 µs, $\lambda=2.1$
Figure 24:
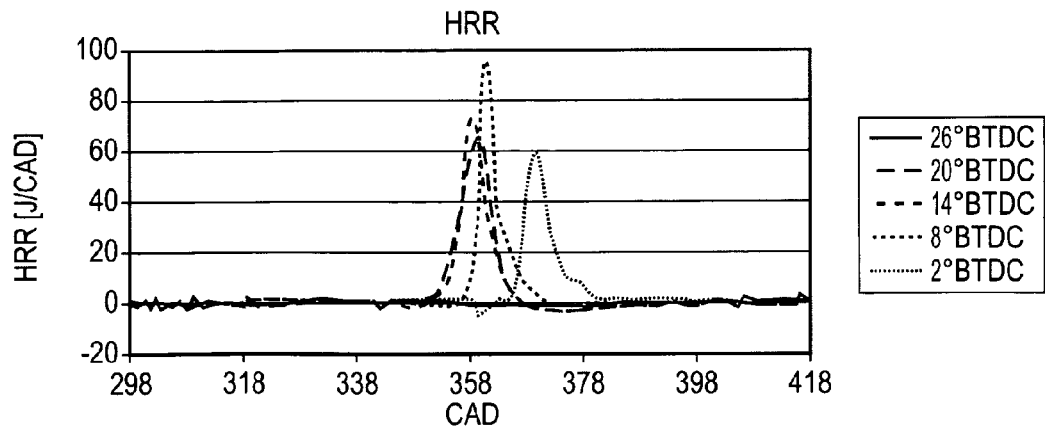
FIG. 24: HRR vs. PT, PD 250 µs, $\lambda=2.1$

Observations at middle load ($\lambda=2.1$):

As can be seen on FIG. 18, the range of injection reduces as the load increases due to a higher percentage of bioethanol that cools the charge. However, the behaviour of the engine at middle load with regards to the injection timing is very similar to its behaviour at lower load. The smoothest pressure trace (FIG. 23) synonymous of quiet functioning and the lowest HRR are observed for an injection timing of 20° BTDC. This injection timing gives also low NOx emissions and good use of the fuels (FIG. 22).

Figure 25:
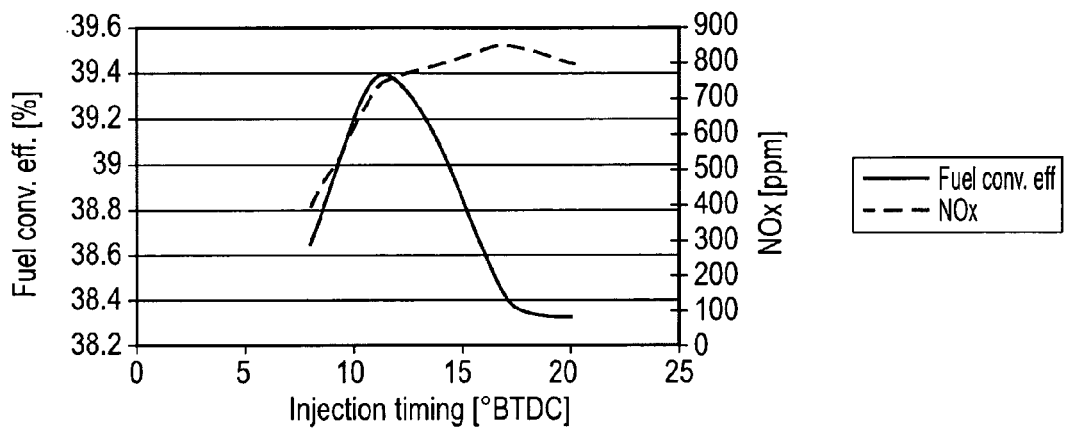
FIG. 25: Fuel conversion efficiency & NOx vs. PT, PD 250 µs, $\lambda=1.5$
Figure 26:
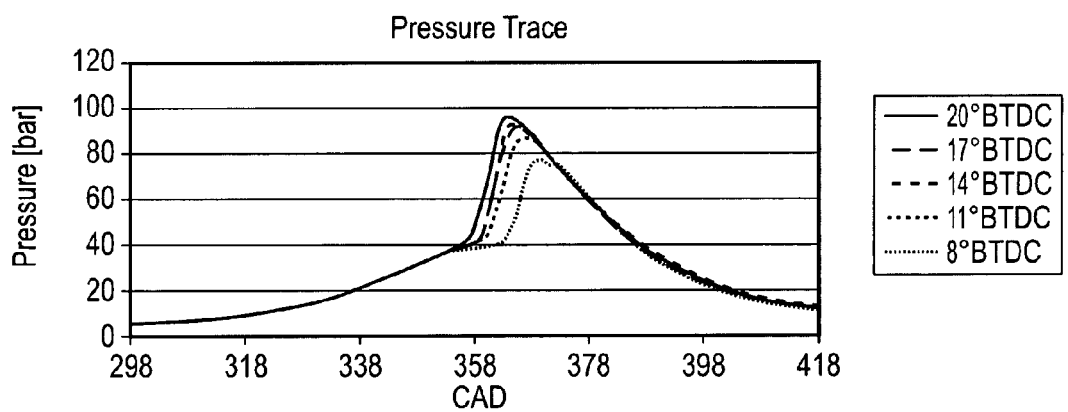
FIG. 26: Pressure trace vs. PT, PD 250 µs, $\lambda=1.5$

Observations at high load ($\lambda=1.5$):

At high load, the observations differ from those observed above. An advance injection makes the engine more prone to knock (FIG. 26) leading to high NOx emissions and low fuel conversion efficiency (FIG. 25). However, injection timing that is too retarded is also responsible of poor performance.

Figure 21:
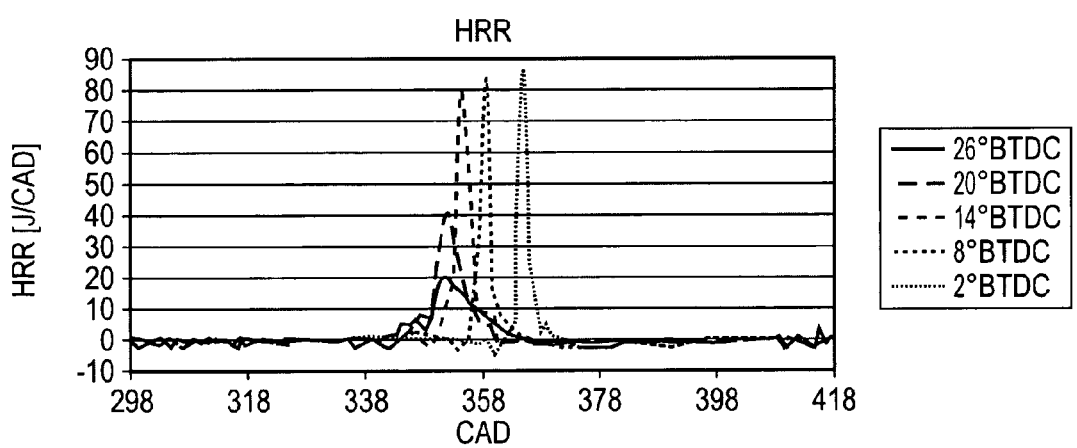
FIG. 21: HRR vs. PT, PD 250 µs, $\lambda=4$
Figure 27:
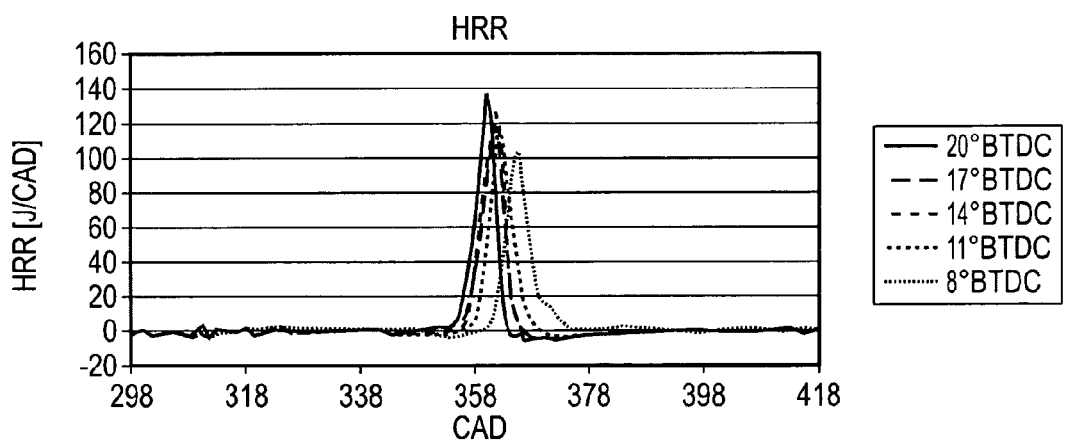
FIG. 27: HRR vs. PT, PD 250 µs, $\lambda=1.5$

It can also be seen when comparing FIG. 21 and FIG. 27 that the injection has a less dramatic effect on the HRR (and pressure trace) at high load than at low load.

The injection timing also plays a role in the minimum quantity of pilot fuel that is needed to ignite the mixture (modification of FIG. 13). For example an injection of 14° allows the mixture to be ignited at every load with a pilot duration of only 220 µs. However, the drawback of retarded injection timing on noxious emissions is not compensated by the smaller quantity of injected pilot fuel and it thus preferable to operate the engine with an injection timing of 20° and more pilot fuel.

6) Effect of Multi-Spilt Injection

As it has been said in the previous sections, with only a pilot injection it is impossible to reach full load with "acceptable" noxious emissions and without knock. The limit load is around 1.9 for a pilot injection of 250 µs. Multi-split injection of which the goal is to reduce the injection rate of Diesel was investigated to improve knock resistance and reduce noxious emissions.

A comprehensive string of tests was performed to analyse the effects of the number of pulses, the injection timing of pilot and main injections as well as their respective duration.

Figure 28:
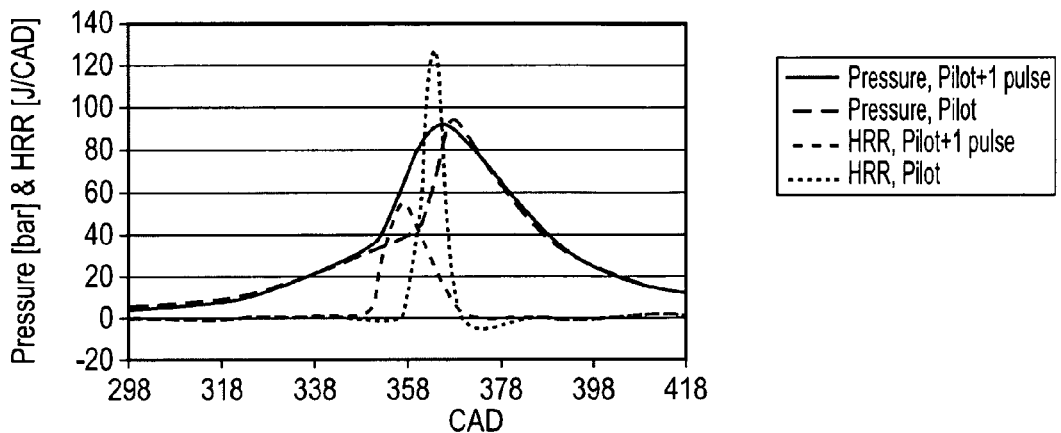
FIG. 28: Pressure trace & HRR, pilot against multi-split injection, $\lambda=1.3$

But firstly, to sample the effects of multi-split injection, a comparison between pilot and pilot+1 pulse is shown on FIG. 28.

It can clearly be seen that the effects of multi-split injection on Dual-Fuelling at high load is beneficial. The knock resistance is greatly improved whereas the noxious emissions are much lower due to a smaller value of HRR.

The explanation of the combustion behaviour under multi-split injection is found in the important cooling effect of the fuel of the main injection. Indeed the in-cylinder temperature is lowered as Diesel evaporates nearly instantaneously when it enters the combustion chamber. This important cooling of the charge almost stops the combustion during a fraction of second and thus limits the HRR and the pressure slope. For almost instantaneous evaporation to occur, the cylinder temperature must be high enough. This fact limits the extension of multi-split strategy at low load.

Another key aspect of multi-split injection is that it decreases the percentage of bioethanol, and by the same the ignition delay, limiting the time during which branching agents responsible for knock can be formed.

7) Effect of the Main Injection Timing

To investigate the influence of the main injection timing, a pilot injection of 180 µs was injected at 20° BTDC all through the tests.

Figure 29:
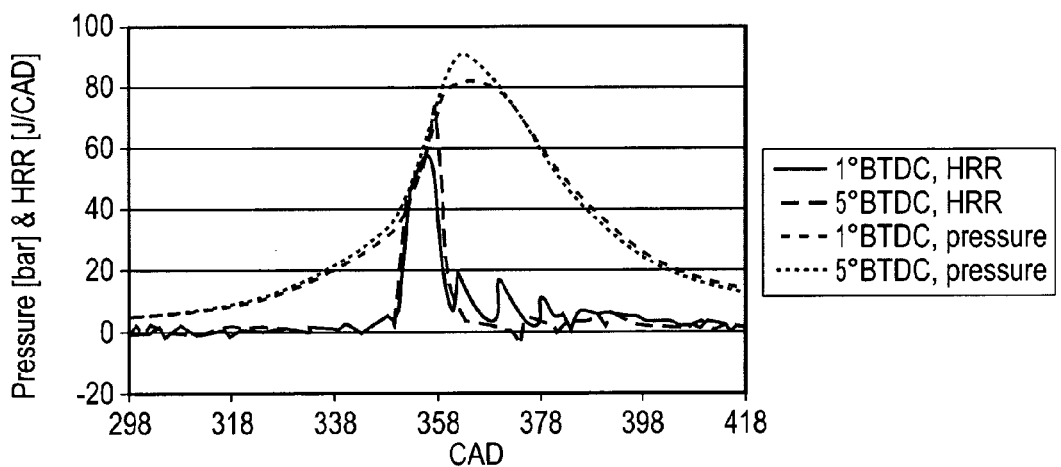
FIG. 29: Pressure trace & HRR, PD 180 µs, PT 20° BTDC, MD 400 µs, 4 pulses, $\lambda=1.3$
Figure 30:
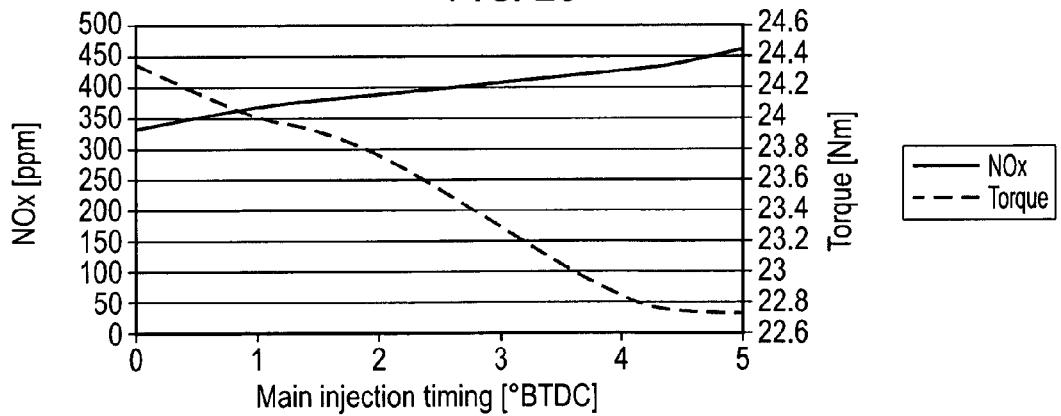
FIG. 30: Nox & Torque vs. MT, PD 180 µs, PT 20° BTDC, MD 400 µs, 4 pulses, $\lambda=1.3$

To obtain the desired slowing down of heat release rate and improved knock resistance, the separation of the pilot and main injections must be sufficiently marked to reach a sufficient temperature in the cylinder before injecting the main pulse fuel. If the separation between the two injections is too small, the temperature in the cylinder is not high enough to evaporate almost instantaneously the main pulse fuel and the effect of multi-split injection is less significant. This is illustrated on FIG. 29 where the main timing of 1° BTDC presents lower HRR and smoother pressure trace than a main timing of 5° BTDC. The NOx emissions (FIG. 30) follow the same evolution as the HRR whereas the output torque is higher for a more retarded main injection timing due to higher pressure during the expansion stroke.

However, if the separation of the two injections becomes too important (FIG. 31), cycle to cycle variation becomes more important, pressure trace is less smooth and slightly more noise is emitted by the engine (two peaks in the pressure trace).

To investigate the effect of main injection timing on particulate emissions, the pilot timing, pilot quantity, the number of pulses, the load and the amount of bio ethanol were kept constant while the main timing was varied. Particulate emissions follow the same behaviour as the NOx emissions, namely a more retarded timing leads to lower soot quantity in the exhaust flow (FIG. 32).

8) Effect of the Pilot Injection Timing

As mentioned in the previous section, a certain interaction exists between the pilot and main injections. This interaction limits strongly the pilot injection range:

If the pilot injection is too retarded, the main injection occurs too late in the expansion stroke (due to the separation needed between the two injections) leading to poor performance.

If the pilot is too retarded, violent pressure rise and important HRR are observed because of the almost misfiring of the pilot injection that does not increase the cylinder temperature before the main injection (FIG. 33). The effect is identical to the one obtained with only a big quantity of pilot fuel.

The soot behaviour in function of the pilot timing is very similar to what has been observed in the previous section. The separation of the two injections needs to be sufficient to limit the amount of particulates formed during the combustion (FIG. 34).

9) Effect of the Pilot Fuel Quantity

It can clearly be seen from FIGS. 35 and 36 that a small quantity of pilot fuel has a beneficial effect on the reduction of NOx emissions, on the fuel conversion efficiency, on bsfc and on knock resistance. However, a too small quantity of pilot fuel can lead to misfire and high hydrocarbon emissions because of the lack of input energy to ignite the main injection. This effect can be observed on FIG. 37 where the pilot duration of 100 µs starts to show signs of weak combustion stability (long ignition delay, spread energy release, . . . ). On the other hand, larger pilot fuel quantities give higher HRR, NOx emissions and knock level. The ideal quantity of pilot fuel is the one that is just sufficient to bring the cylinder temperature at a high enough level to evaporate quickly the main pulse fuel.

Figures 37, 38:
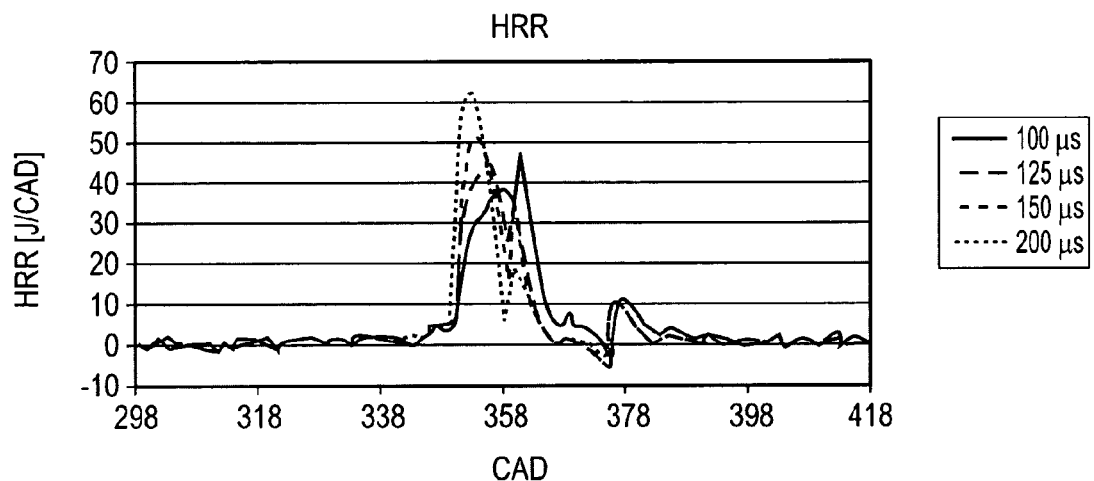
FIG. 37: HRR vs. PD, PT 20° BTDC, MD 400 µs, MT 2° BTDC, 4 pulses, $\lambda=1.5$
FIG. 38: Soot vs. PD, PT 20° BTDC, MT 0° BTDC, MD 260 µs, 2 pulses, $\lambda=1.5$

Concerning particulate emissions, the amount of pilot injection does not have a very significant effect. Nevertheless, the general trend is that a smaller pilot quantity slightly reduces the soot level in the exhaust gases (FIG. 38).

10) Effect of the Main Injection Duration

Figure 39:
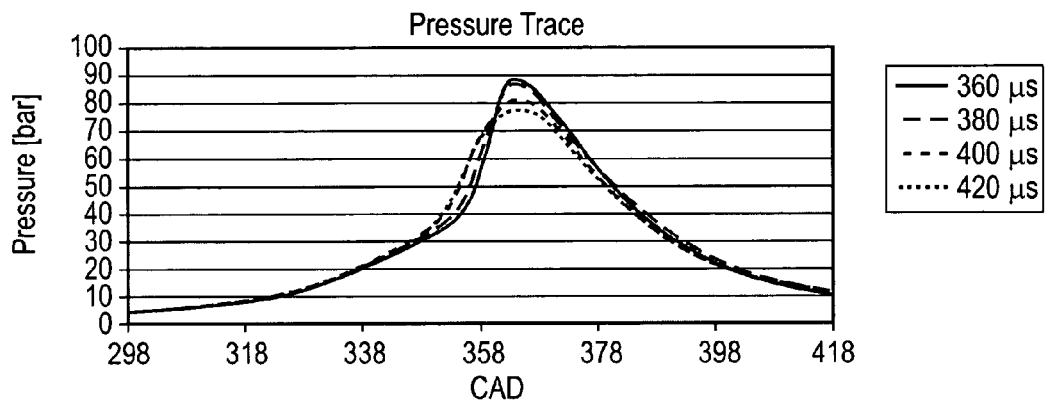
FIG. 39: Pressure trace vs MD, PT 20° BTDC, PD 180 µs, MT 2° BTDC, 4 pulses, $\lambda=1.5$
Figure 40:
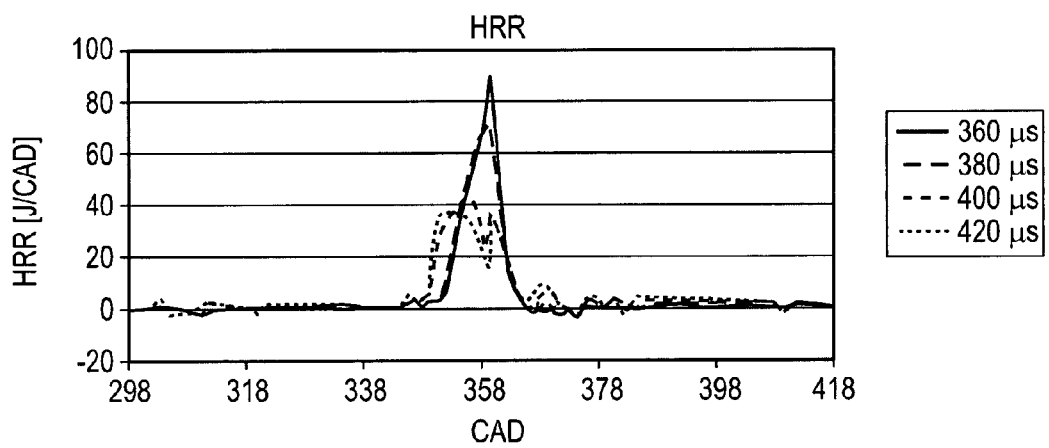
FIG. 40: HRR vs MD, PT 20° BTDC, PD 180 µs, MT 2° BTDC, 4 pulses, $\lambda=1.5$

The effect of the main injection duration is directly related to the quantity of bioethanol that is injected. A longer duration of main injection is synonymous of a lower quantity of fumigated fuel when all the other parameters remain unchanged. FIG. 39 and FIG. 40 compare the effect of the main injection duration with a constant pilot duration of 180 µs, constant injection timings of 20° BTDC (pilot) and 2° BTDC (main) while four pulses compose the main injection.

It is clearly observed that shorter durations present sign of knock (steep pressure rise, single peak in the HRR plot) whereas longer durations offer a smooth pressure trace. The longer ignition delay resulting from higher percentage of bioethanol prevents the pilot injection to heat the charge before the main injection cancelling the desired effect of multi-split injections.

Figure 41:
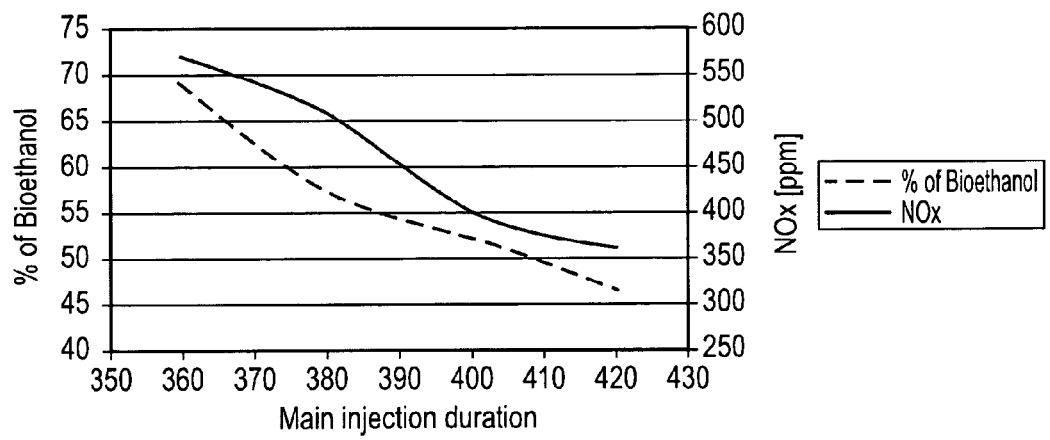
FIG. 41: % of Bioethanol & NOx vs. MD, PT 20° BTDC, PD 180 µs, MT 2° BTDC, 4 pulses, $\lambda=1.5$

It is interesting to plot the percentage of bioethanol against the main duration to obtain a limit of the substitution rate (around 55%) of Diesel by bioethanol under non knocking operation as shown in FIG. 41. This figure also illustrates the behaviour of noxious emissions against main duration (short duration gives high emissions) that is consistent with the HRR plot.

The impact of the main injection duration is illustrated in FIG. 42. A small quantity of main fuel gives less soot because the quantity of fuel that is injected in a hot and rich region is limited. This observation is opposite to the one that limits NOx emissions.

11) Effect of the Number of Pulses

Main injections composed of one, two, three and four pulses were investigated in order to determine the influence of the number of pulses on high load operations.

The general observation is that the number of pulses within the main injection does not have a big influence on the results apart from the fact that the single pulse that gives slightly higher peak pressure and HRR (FIG. 43 and FIG. 44).

FIG. 44 shows the NOx emissions that are only slightly affected by the number of pulses within the main injection.

It has also been observed that a small adjustment of the main timing should be performed in terms of the number of pulse to obtain the best possible results. An example for only one pulse, the ideal main timing is around 5° BTDC whereas for four pulses it is around 1° BTDC.

Figures 45, 46:
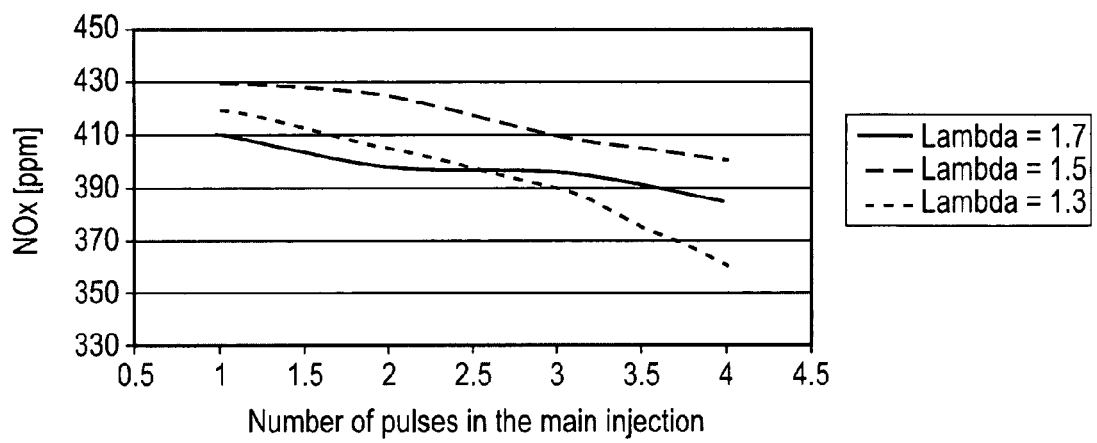
FIG. 45: NOx in function of number of pulses and load
FIG. 46: Soot Vs number of pulse, PT 20° BTDC, PD 150 µs, MT 0° BTDC, 55% Bioethanol, $\lambda=1.5$

The major effect of the number of pulse composing the main injection can be appreciated when particulate emissions are measured. As illustrated in FIG. 46, a reduced number of pulses has a very beneficial effect on the soot level, as the soot formation is enhanced under locally rich and hot mixture, conditions such as are present in the cylinder when the last pulse(s) of the main injection enter(s) the cylinder.

It can be seen from FIG. 46 that three and four pulse main injections must be avoided in order not to loose the beneficial effect of the bioethanol fumigation on the soot level (four pulses give almost the same amount of soot as pure Diesel).

It would appear that only one pulse gives the best compromise between soot level and NOx emissions.

12) Effect of the Quantity of Fumigated Fuel

The amount of fumigated fuel plays a role in the combustion stability (misfiring & knock) and emissions. This section only summarizes the observation made previously.

It has been observed that the NOx emissions go up when the percentage of bioethanol increases whereas the particulates emissions go down. The ignition delay is also sensible to the quantity of bioethanol, namely a bigger percentage of bioethanol leads to a longer ignition delay.

Figure 47:
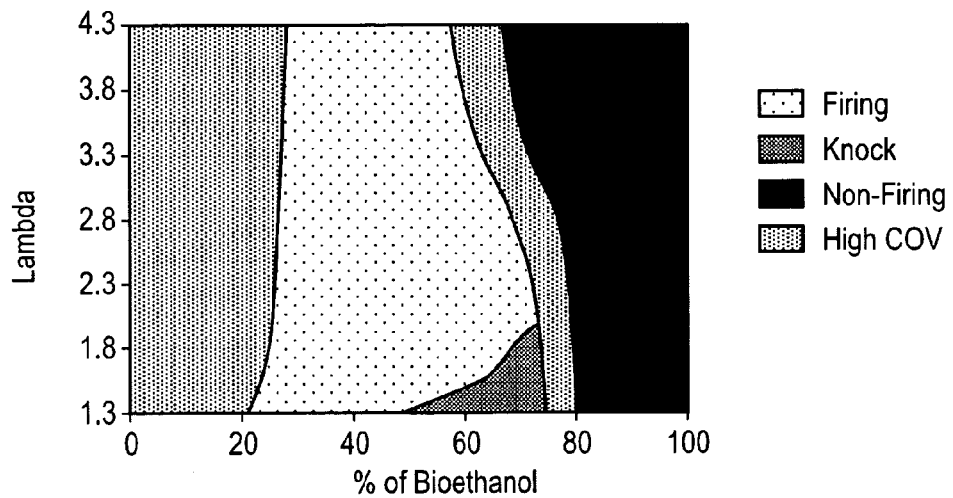
FIG. 47: Engine functioning regimes vs. load & Bioethanol percentage, pilot of 250 µs, 20° BTD

FIG. 47 illustrates the different behaviour of the engine with the percentage of bioethanol. This map has been created taking into account all the improvements presented in the previous paragraphs (injection timing, injection duration, multi-split injections). Moreover, as said before for the other maps, the different areas of the map are well separated with the aim of simplifying understanding whereas in reality the transition between functioning modes occurs smoothly.

- High COV area: When the amount of bioethanol is small, the mixture formed inside the cylinder is very lean and is not easy to ignite. Important cycle to cycle variations are thus observed and are inevitably accompanied by low fuel conversion efficiency. The same kind of observations is made if the percentage of bioethanol is slightly too high to prevent regular ignition.
- Non-firing area: When a significant quantity of bioethanol is injected, the charge cooling effect it has does not permit ignition of the mixture. This functioning regime must be avoided as the engine does not produce any work and rejects all the fuel that was injected.
- Knock area: When the quantity of bioethanol is significant but not enough to prevent ignition, knock is observed even with split injections. Moreover as the load increases, the bioethanol proportion must be decreased in order to obtain knock free operation.
- Firing area: As can be seen from FIG. 47, the firing area or normal operation area is reachable at every load. Diesel can be replaced by bioethanol in a proportion that can reach 70% at middle load.

13) Effect of Water into Bioethanol

To investigate the influence of water on the performance of the engine, four series of tests were realized with mixtures containing 0, 5, 10 and 15% in mass of water. The same pilot injection duration (250 μs) and injection timing (20° BTDC) were used for all the tests and the lambda ranges from 4 to 1.3.

Figure 48:
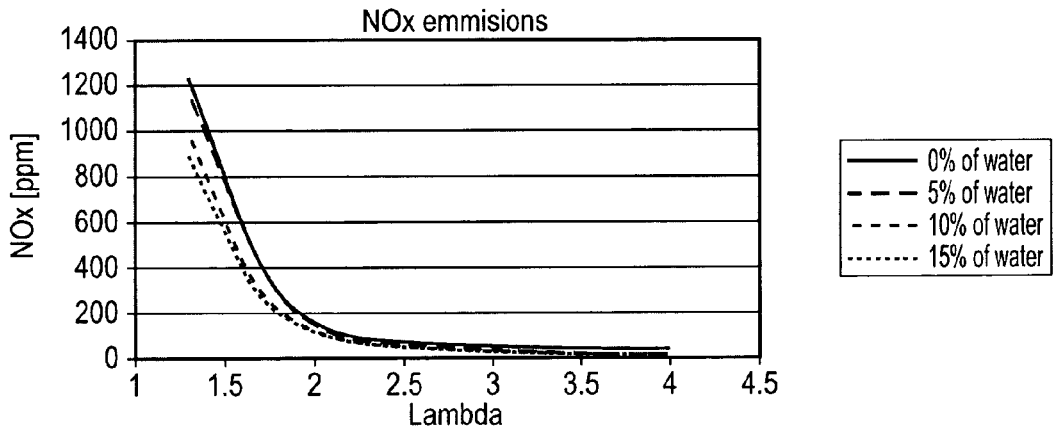
FIG. 48: NOx emissions in function of water quantity, PT 20° BTDC, PD 250 µs
Figure 49:
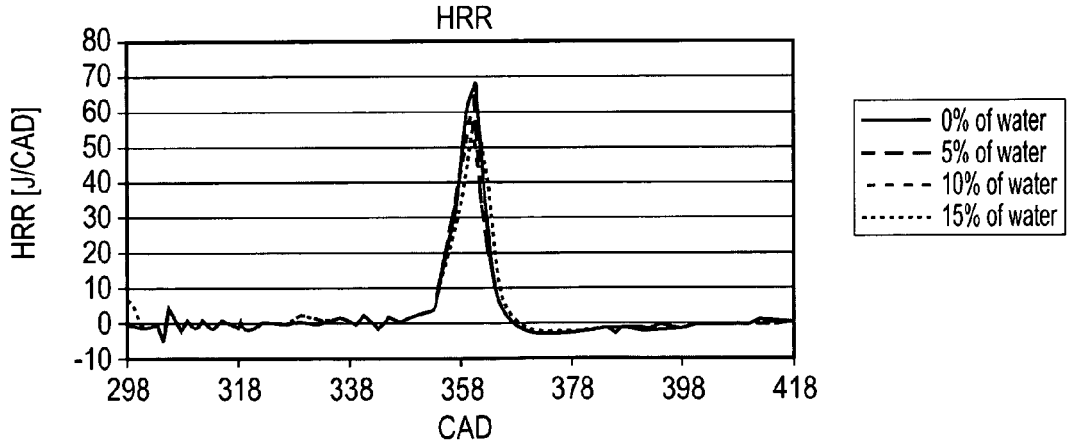
FIG. 49: HRR, different water quantities, PT 20° BTDC, PD 250 µs, $\lambda=2.1$

The effect of water on the different parameters characterizing the engine performance is actually quite limited for the range of water/bioethanol mixture tested. The noxious emissions only drop slightly when a more important percentage of water is present in the mixture (FIG. 48), fact that is confirmed by the HRR plot (FIG. 49).

Figure 50:
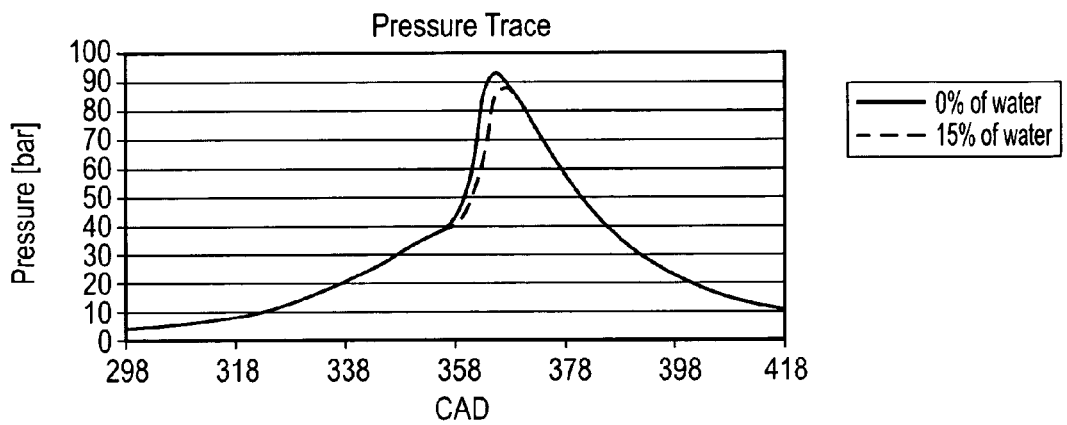
FIG. 50: 0 & 15% water pressure trace comparison, PT 20° BTDC, PD 250 µs, $\lambda=1.3$

To illustrate that water has little effect on knock resistance, FIG. 50 compares pressure traces of mixtures containing 0 and 15% of water (other percentage of water have not been plotted on this figure to improve visibility). The slope of the pressure trace of water/bioethanol mixture being a bit less steep than the one of pure bioethanol indicates a lower knock level but the difference is very limited.

Figure 51:
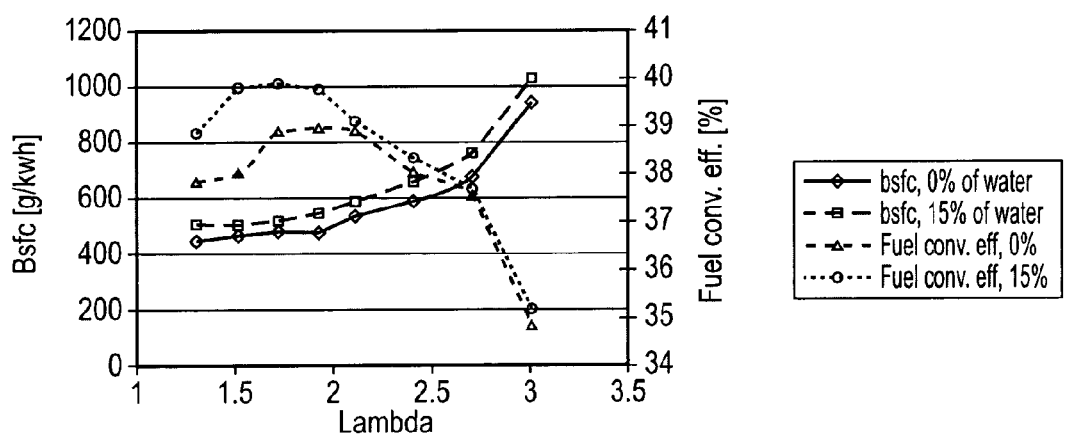
FIG. 51: bsfc & NOx, PT 20° BTDC, PD 250 µs, 0 & 15% water

The main disadvantage of water into bioethanol is that it decreases the energy content of the fuel leading to a higher bsfc even if the fuel conversion efficiency increases by nearly 1% when 15% water content bioethanol is injected in place of neat bioethanol (FIG. 51). This higher fuel conversion efficiency resulting from the presence of water means that for an equivalent amount of energy brought by the bioethanol, the output torque will be slightly higher.

Figure 52:
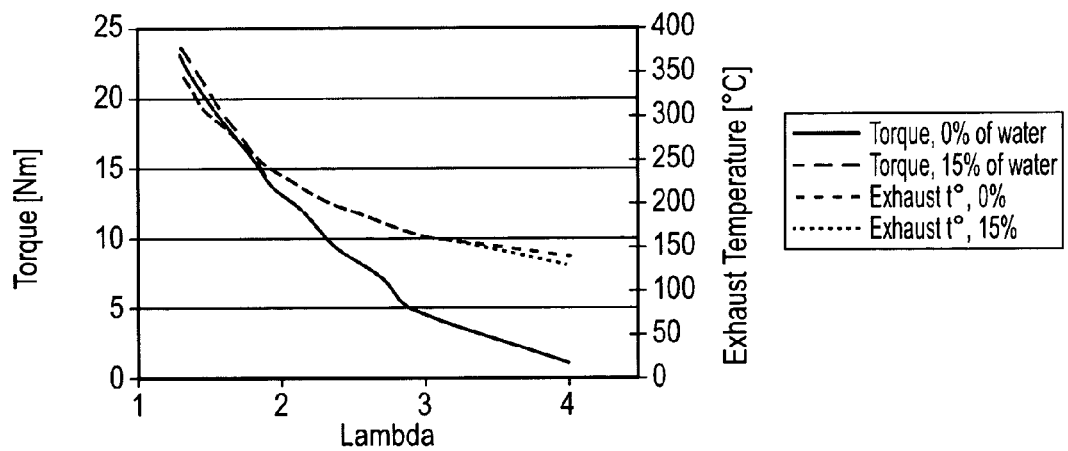
FIG. 52: Torque & exhaust temperature, PT 20° BTDC, PD 250 µs, 0 & 15% of water

The output torque of the engine is negligibly affected by the water as well as, surprisingly, the exhaust temperature (FIG. 52).

As the energy content of water/bioethanol mixture is lower than the one of neat bioethanol, more fuel needs to be injected to keep the same torque output. This fact has a small effect on the amount of pilot fuel needed to ignite the mixture and on the injection timing range as illustrated in Table 1 (SOI: Start of Injection).

TABLE 1

Influence of water quantity on pilot duration and timing.

| Water Content | Max. SOI at $\lambda = 3$ | Min. SOI at $\lambda = 3$ | Max. $\lambda$ for pilot of 150 μs & 20° BTDC before misfiring |
|---|---|---|---|
| 0% | 3 | 26 | 3.2 |
| 5% | 4 | 25 | 3.3 |
| 10% | 6 | 22 | 3.5 |
| 15% | 7 | 22 | 3.6 |

Figure 53:
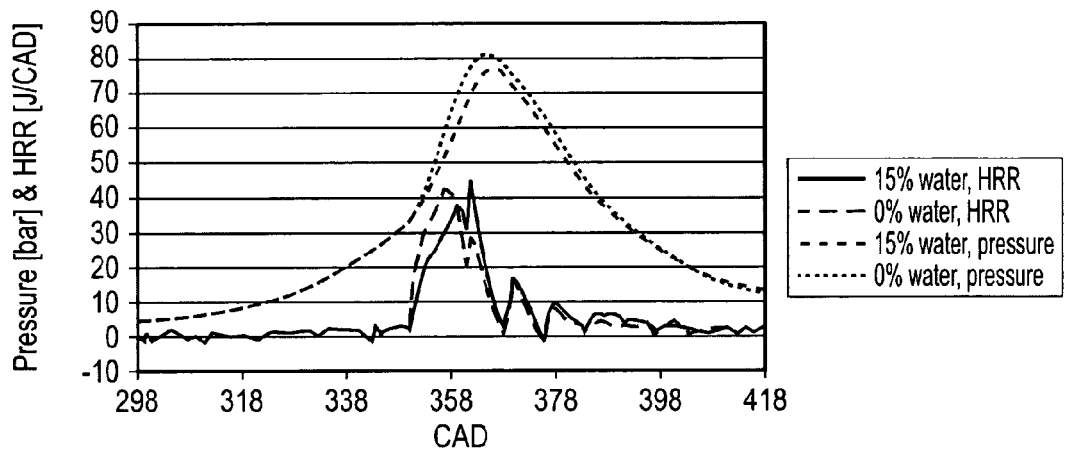
FIG. 53: Pressure trace and HRR, multi pulses, $\lambda=1.3$
Figure 54:
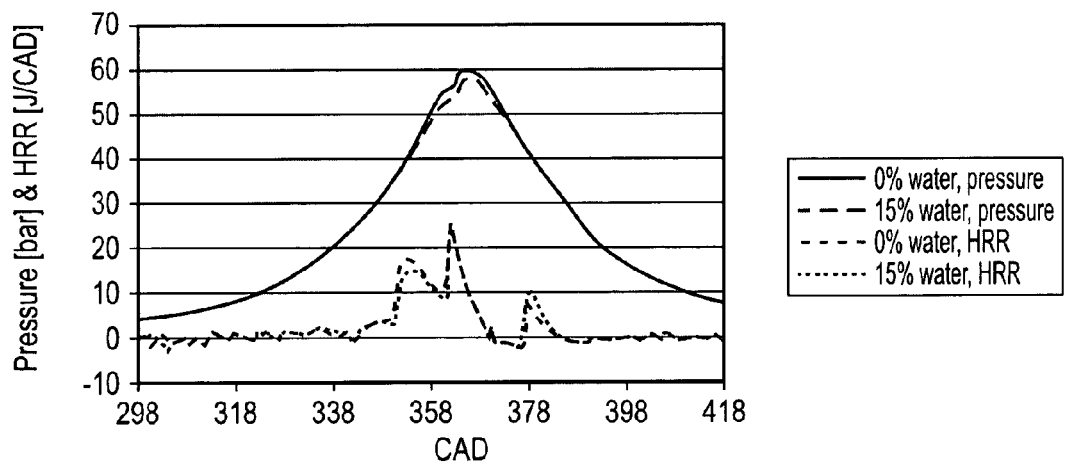
FIG. 54: Pressure trace & HRR, multi pulses, $\lambda=2.7$

To finish with the influence of water into the fuel, multi pulse pressure traces are shown on FIG. 53 & FIG. 54. The effect of water is again quite limited (negligible at low load) even if it tends to need a bigger quantity of pilot fuel to obtain a stable combustion when water is present as explained just above.

Figure 55:
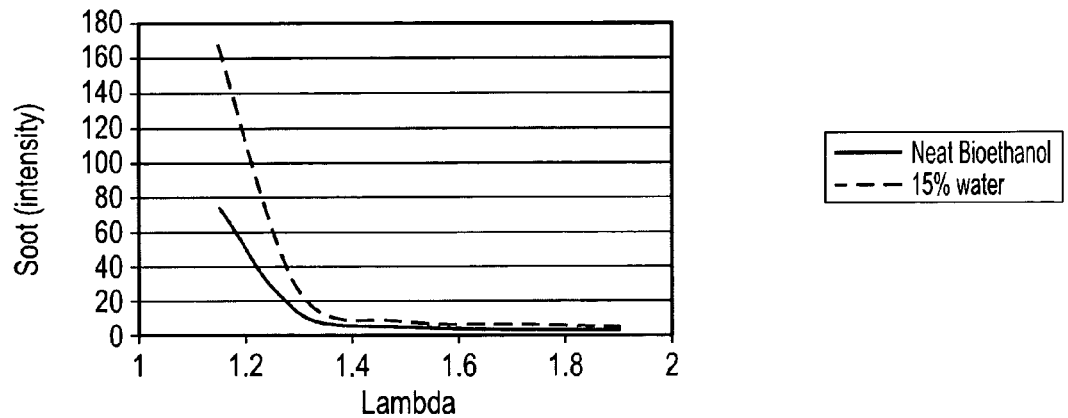
FIG. 55: Soot comparison between neat Bioethanol & 15% water/85% Bioethanol mixture
Figures 56, 57:
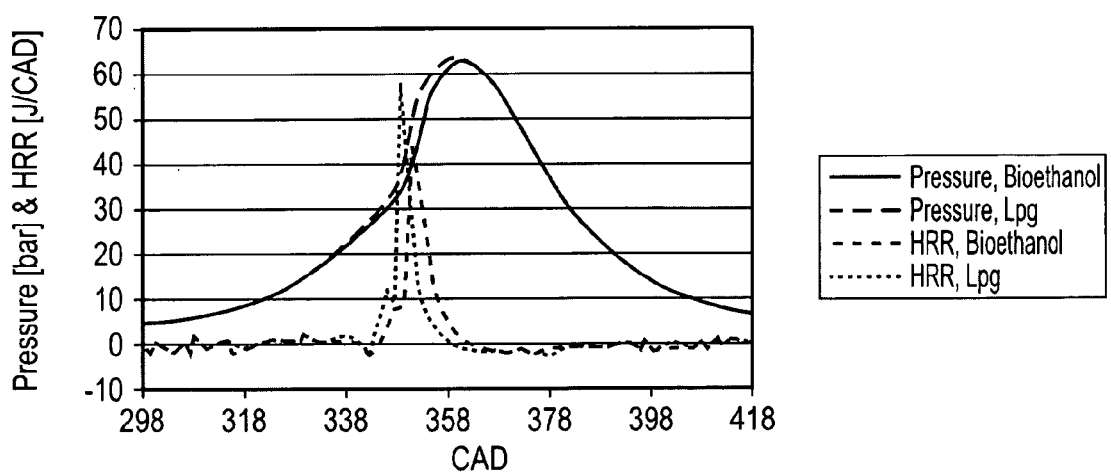
FIG. 56: Effect of water into Bioethanol on particulate emissions
FIG. 57: Pressure trace & HRR, LPG vs. Bioethanol, PT 20° BTDC, PD 250 µs, $\lambda=4$

As expected from the literature survey, the presence of water into bioethanol does not have a big influence on the soot level. The general observation is that hydrated bioethanol gives a slightly higher amount of particulates than neat bioethanol (FIG. 55). The difference between the two was only really noticeable at very high load (FIG. 56).

14) Comparison Between Bioethanol and LPG Dual-Fuel

One of the most popular fuels for Dual-Fuel operation is the Liquid Petroleum Gas and it is therefore interesting to make a small comparison between the results obtained with bioethanol and the results that can be obtained with LPG.

Figure 58:
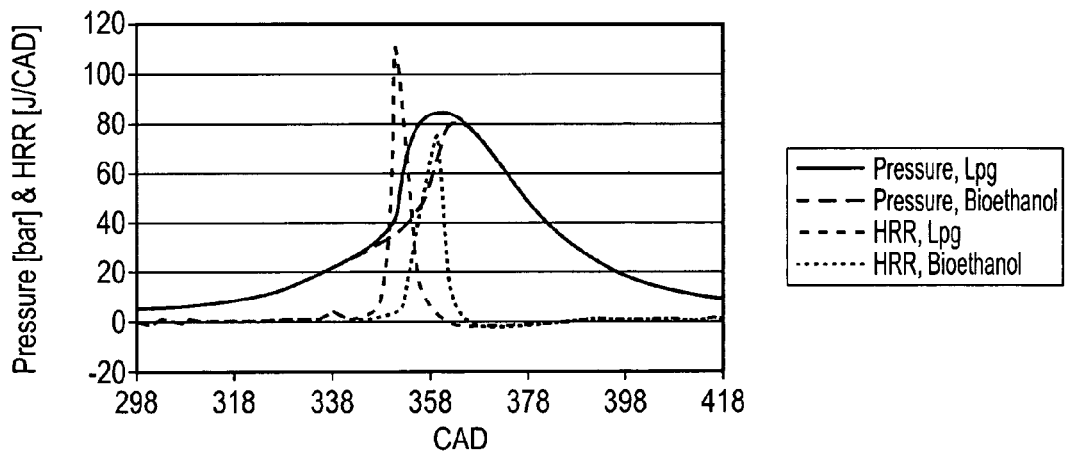
FIG. 58: Pressure trace & HRR, LPG vs. Bioethanol, PT 20° BTDC, PD 250 µs, $\lambda=2.1$

The first tests made to compare the two fuels were performed with only a pilot injection. The pilot timing and pilot duration were kept constant at 20° BTDC and 250 μs, respectively. Whether it is at low load or at higher load (FIG. 57 and FIG. 58), the LPG presents higher HRR (thus higher NOx emissions) and slightly steeper pressure rise than bioethanol. However, the injection parameters were certainly not optimal for LPG whereas they were close to ideal for bioethanol, which can explain the higher tendency of knock observed with LPG due to a too large quantity of pilot fuel.

Figure 59:
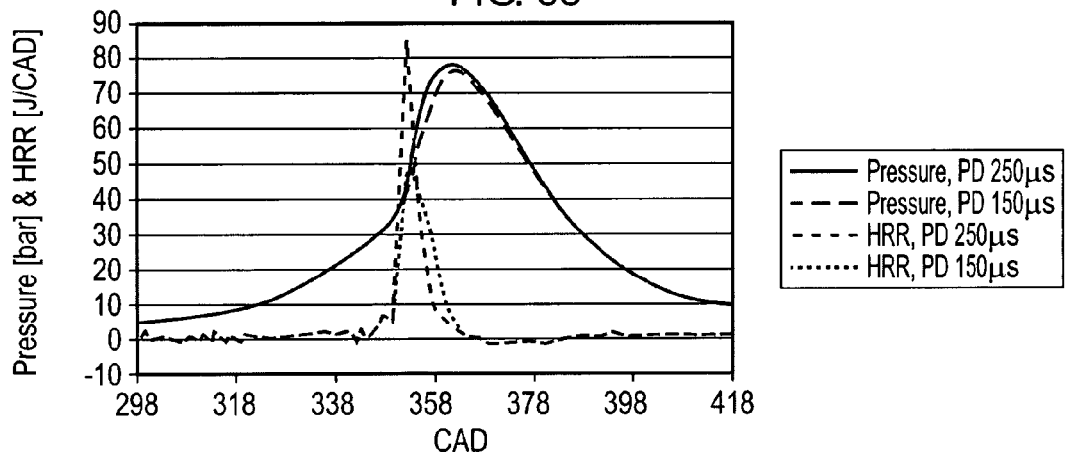
FIG. 59: Influence of pilot quantity on LPG/Diesel operation, $\lambda=2.4$

It is clear when looking at FIG. 59 that the knock resistance and NOx emissions can be improved for LPG if the pilot duration is reduced. It was also observed that, compared to bioethanol, LPG accepts much lower pilot duration and much advanced injection timing. This was foreseeable as the important charge cooling resulting from the high latent heat of evaporation of bioethanol requires more input energy and more accurate timing to properly ignite the mixture.

Figure 60:
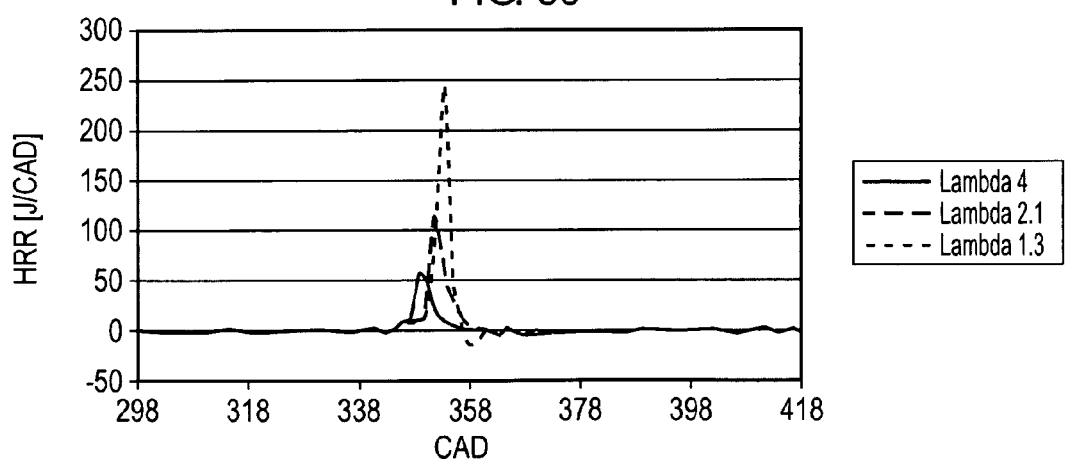
FIG. 60: HRR, LPG/Diesel, different load, PT 20° BTDC, PD 250 µs.

It has been previously explained that the percentage of bioethanol has a significant influence on the ignition delay whereas it can be seen from FIG. 60 that the percentage of LPG (higher is the load higher is the percentage of LPG) has only a small effect on the ignition delay. This seems to constitute the main difference between bioethanol and LPG fumigation but should be less marked with proper injection parameters for LPG.

Figure 61:
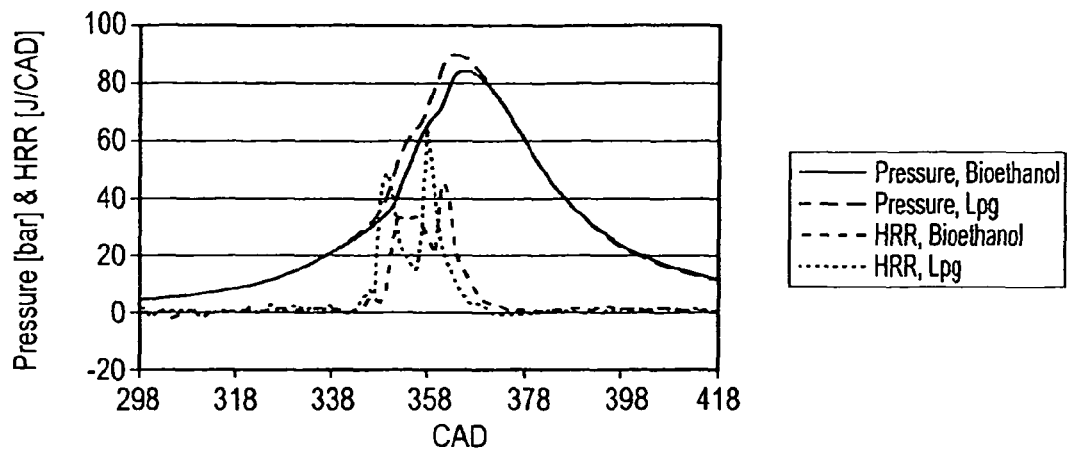
FIG. 61: Pressure trace & HRR, LPG vs. Bioethanol, PT 20° BTDC, PD 180 µs, MT 5° BTDC, MD 250 µs, $\lambda=2.4$

Multi-split injection was also tested to confirm its effect on Dual-Fuel operation with another fuel than bioethanol. FIG. 61 compares pressure trace and HRR of LPG and bioethanol that are quite similar. The comments made just before when discussing the behaviour with only a pilot injection still apply with multi-split injections.

Figure 62:
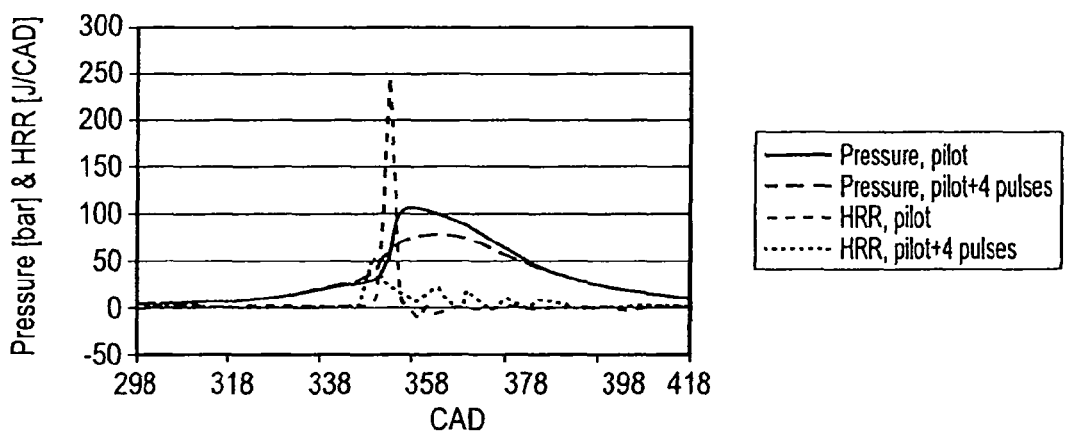
FIG. 62: Pressure trace & HRR, LPG, Pilot & Pilot+4 pulses comparison, $\lambda=1.3$

To finish with this section on LPG fumigation, the effect of multi-split injection is also very impressive with LPG as can be judged from FIG. 62.

15) Summary of Test Results

However, this section summarizes the best results that were obtained in the preceding experiments to establish a comparison between Diesel and bioethanol/Diesel Dual-Fuel operation.

It should be understood by "better results" is meant those which present the best compromise between NOx and Soot emissions and knock level. The injection parameters giving these best results are shown in Table 2. Only a pilot injection is used until mid-load as it gives low NOx, soot free combustion and reasonable pressure rise. Moreover, at low load, multi-split injection is not really well adapted due to the relatively low temperature in the cylinder preventing quick evaporation of the main pulse fuel.

TABLE 2

Injection parameters in function of the load.

| Lambda | PT [° BTDC] | PD [µs] | MT [° BTDC] | MD [µs] | Pulses within main injection | Percentage of Bioethanol |
|---|---|---|---|---|---|---|
| 4 | 20 | 250 | — | — | — | 29 |
| 3 | 20 | 250 | — | — | — | 49 |
| 2.7 | 20 | 250 | — | — | — | 58 |
| 2.4 | 20 | 250 | — | — | — | 63 |
| 2.1 | 20 | 250 | — | — | — | 68 |
| 1.9 | 20 | 150 | 5 | 100 | 1 | 65 |
| 1.7 | 20 | 150 | 5 | 150 | 1 | 65 |
| 1.5 | 20 | 150 | 5 | 280 | 1 | 61 |
| 1.3 | 20 | 180 | 5 | 300 | 1 | 51 |
| 1.15 | 20 | 180 | 5 | 350 | 1 | 45 |

Figure 63:
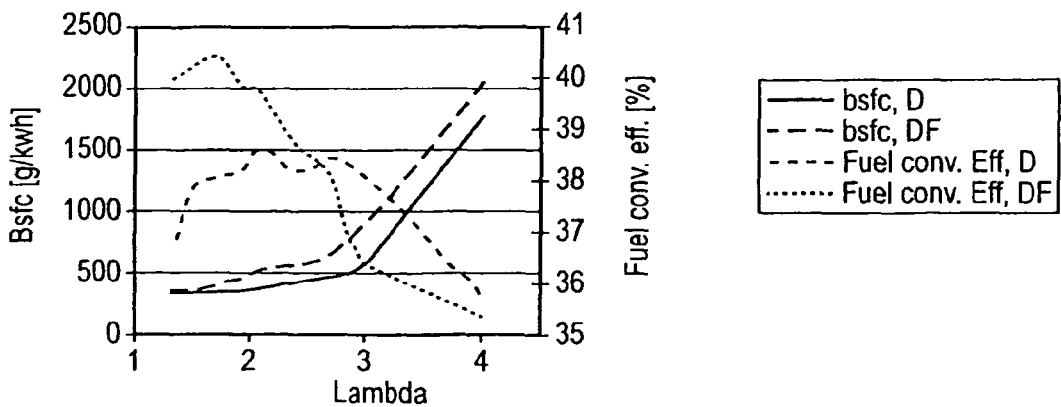
FIG. 63: bsfc & Fuel conversion efficiency, comparison Diesel/Dual-Fuel

Bsfc and fuel conversion efficiency are plotted on FIG. 63. It is clear that Dual-Fuelling is still disadvantaged by the low LHV of bioethanol but the soot and knock free combustion at high load decreases the difference that exists at low load.

The NOx emissions (FIG. 64) are also affected by bioethanol fumigation, Dual-Fuelling taking the advantage at low load whereas the opposite situation is observed at high load.

Figure 64:
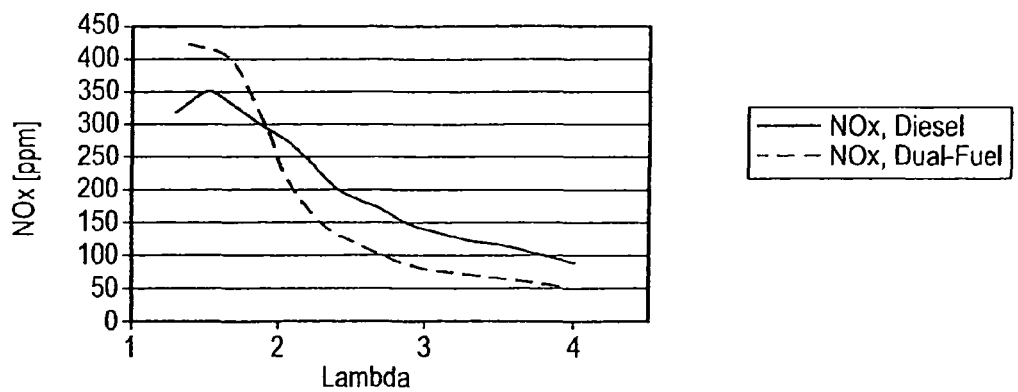
FIG. 64: NOx emissions, Diesel Vs. Dual-Fuel
Figure 65:
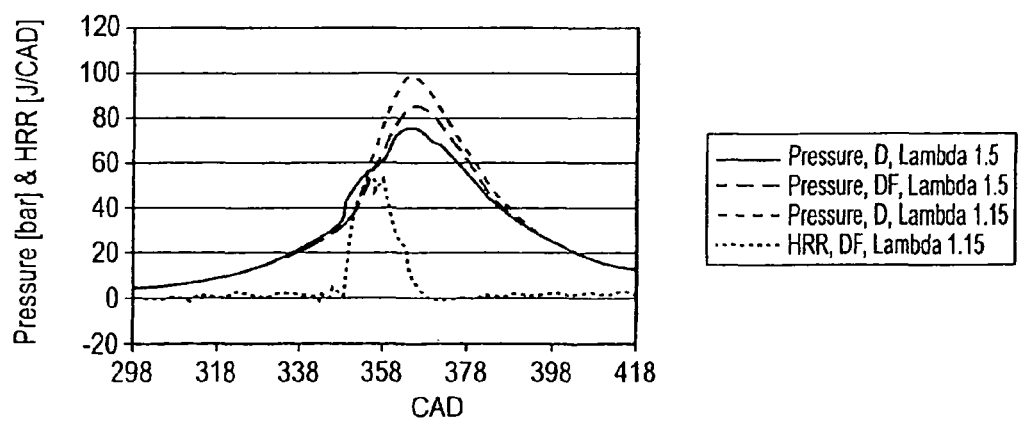
FIG. 65: Pressure trace & HRR, Diesel Vs Dual-Fuel

As can be seen from FIG. 64, the knock level under Dual-Fuel operation is comparable to the one of Diesel. Finally, pressure trace and HRR at very high load ($\lambda$=1.15) are also plotted on FIG. 65 and both present reasonable peak values. It is thus possible to get some extra torque out of the engine with Dual-Fuelling without compromising emissions and stressing the engine components too much.

16) Conclusion

The use of only a pilot injection to ignite the mixture formed by air and bioethanol in the cylinder gives a soot free combustion all through the load range independently of the injection parameters and reduces NOx emissions from low to middle load compared to Diesel, due to the cooling effect that bioethanol fumigation has. However, when the load becomes too high (around $\lambda$=2), knock starts to appear and NOx emissions violently increase.

The influences of different injection parameters were investigated to improve the characteristics of Dual-Fuel operation:

The pilot fuel quantity must be sufficient to ignite correctly the mixture at every load. Indeed, a too small injection gives lot of cycle to cycle variations or even causes misfire. However, a too big quantity is also detrimental as it increases knock level and NOx emissions. The ignition delay is affected by the pilot quantity, namely bigger is the pilot quantity shorter is the ignition delay.

The injection timing range has been found to be quite small. Two tendencies were observed in function of the injection timing and depending on the load. From low load to middle load, an advanced injection is favourable with regards to knock, NOx emissions and combustion stability. At higher loads, the injection timing should be retarded to slightly limit knock level and NOx emissions.

It has also been observed that the ignition delay is very sensitive to the percentage of bioethanol (from 30% to 70% in mass), a bigger quantity of bioethanol leading to an increased ignition delay.

Multi-split injection brings NOx emissions close to the level of Diesel ones at high load. The pilot injection ignites the mixture and the in cylinder temperature starts to rise. If the pulse coming from the main injection is injected at the correct moment, it evaporates instantaneously making the temperature to drop. This has the effect of almost stopping the combustion during a fraction of a second and thus limits the HRR and pressure rise.

Different injection parameters were investigated:

Very important parameters are the injection timings of the pilot and main pulses. As explained above the main pulse should arrive in the combustion temperature when the temperature is sufficiently high. This means that the two injections must be well separated. If they are too close or if the pilot injection timing is too advanced to ignite the mixture, the temperature is not high enough and the effect of the main pulse is the same as if a bigger pilot quantity was injected. However if the pulses are too separated or if the pilot is too retarded, cycle to cycle variations become more important.

The pilot fuel quantity plays a smaller role. A small pilot quantity that gives high enough temperature before injecting the main pulse seems ideal to reduce NOx emissions and knock level.

The main injection quantity is directly related to the percentage of bioethanol and can play a significant role. As said before the ignition delay being strongly influenced by the percentage of bioethanol, a too big percentage or equivalently a too short main injection does not allow the temperature to rise sufficiently before the main injection and almost cancels the effect of multi-split injection.

The most important parameter is the number of pulses composing the main injection. It has an extremely big influence on soot emissions whereas knock level and NOx emissions are only slightly affected. Only one pulse in the main injection gives nearly soot free combustion. When the number of pulses is increased, a bigger quantity of fuel is injected in a hot and rich mixture leading to increased soot level.

Tests with fumigated LPG were also carried out and confirmed that multi-split injections are also effective with a fuel other than bioethanol.

The presence of water in bioethanol reduces its production costs. At least 10% of the price at the petrol station before taxes could be saved for bioethanol produced within the European Union. Also, the influence of water on the overall performance of the engine, is very limited. Water/bioethanol mixture slightly reduces knock tendency and NOx emissions, needs a bit more of pilot fuel to be correctly ignited, increases thermal efficiency, soot level and bsfc.

The invention claimed is:

1. A method of operating a compression ignition engine using two fuels comprising:
supplying a first fuel to a combustion chamber of the engine; and
injecting a second fuel into the combustion chamber;
wherein the first fuel comprises an un-dehydrated biofuel;
wherein the second fuel comprises diesel or biodiesel; and
wherein the second fuel is injected in multiple pulses in each ignition cycle with a first pulse acting as a pilot pulse to trigger ignition, and timing of a next pulse being such as to optimise evaporation of the second fuel and thereby reduce combustion temperature and mitigate knock.

2. A method as claimed in claim 1 in which the pilot pulse is followed by a single further pulse of the second fuel in the ignition cycle.

3. A method as claimed in claim 1 in which the engine is operated in two different modes according to engine load, the pilot pulse being the only pulse of the second fuel injected under light and medium load conditions, and multiple pulses of the second fuel being injected under higher load conditions.

4. A method as claimed in claim 1 in which the first fuel comprises bioethanol.

5. A method as claimed in claim 4 in which the bioethanol includes a proportion of water such that there is more than 1% of water by weight.

6. A method as claimed in claim 1 in which the first fuel comprises one or more of the following volatile liquids: ethanol, butanol, propanol.

7. A method as claimed in claim 1 in which the first fuel comprises more than 30% by weight of the total of the first and second fuels supplied per cycle.

8. A method as claimed in claim 1 in which the first fuel is supplied to the combustion chamber as a single charge per ignition cycle.

9. A method as claimed in claim 1 in which the first fuel is supplied to the combustion chamber in a flow of air or by injection directly into the combustion chamber.

10. A compression ignition engine configured to operate according to the method of claim 1.

* * * * *